US009237172B2

(12) United States Patent
Yu et al.

(10) Patent No.: US 9,237,172 B2
(45) Date of Patent: Jan. 12, 2016

(54) APPLICATION NOTIFICATION AND SERVICE SELECTION USING IN-BAND SIGNALS

(71) Applicant: Qualcomm Incorporated, San Diego, CA (US)

(72) Inventors: Andy I Yu, San Diego, CA (US); Ananthapadmanabhan Arasanipalai Kandhadai, San Diego, CA (US); Alireza Ryan Heidari, Encinitas, CA (US); Min Wang, San Diego, CA (US); Jeremy P Toman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/649,186

(22) Filed: Oct. 11, 2012

(65) Prior Publication Data
US 2013/0035105 A1 Feb. 7, 2013

Related U.S. Application Data

(63) Continuation-in-part of application No. 12/904,900, filed on Oct. 14, 2010.

(60) Provisional application No. 61/555,327, filed on Nov. 3, 2011, provisional application No. 61/348,203, filed on May 25, 2010, provisional application No. 61/373,243, filed on Aug. 12, 2010.

(51) Int. Cl.
*H04W 72/04* (2009.01)
*H04L 29/06* (2006.01)
(Continued)

(52) U.S. Cl.
CPC ........ *H04L 65/1043* (2013.01); *H04L 65/1069* (2013.01); *H04L 65/601* (2013.01); *H04L 69/24* (2013.01); *H04W 76/02* (2013.01); *H04W 76/04* (2013.01); *H04W 88/181* (2013.01)

(58) Field of Classification Search
CPC ..... H04W 72/04; H04W 76/02; H04W 76/04; H04W 88/181; H04L 69/24

USPC ................... 455/450, 426.1, 560, 445, 414.1; 370/467, 352
See application file for complete search history.

(56) References Cited

U.S. PATENT DOCUMENTS 5,768,308 A    6/1998   Pon et al.
6,091,969 A *   7/2000   Brophy et al. ................ 455/560
(Continued)

FOREIGN PATENT DOCUMENTS

EP      1406461 A1    4/2004
EP      1646251 A1    4/2006
(Continued)

OTHER PUBLICATIONS

3rd Generation Partnership Project 2, 3GPP2: "CDMA Tandem Free Operation", 3GPP2-Drafts, 2500 Wilson Boulevard, Suite 300, Arlington, Virginia 22201 USA, May 13, 2002, XP040360914.
(Continued)

*Primary Examiner* — Marisol Figueroa
*Assistant Examiner* — Jean Chang
(74) *Attorney, Agent, or Firm* — Heejong Yoo

(57) ABSTRACT

In-band signaling may be used between two stations to determine the capabilities of the stations and/or send actionable information between the stations participating in the call. The in-band signals are indicative that the station that is transmitting the in-band signals can use in-band signals as a conduit to send and/or receive various types of information and are used to probe whether the receiving station can operate similarly. If the receiving station detects and reacts to the in-band signals, then both stations can pass control information and data as well as enhancements between each other, without any need of infrastructure upgrade and/or quality compromise to legacy phone users. Additionally or alternatively, out of band interfaces and watermarking may also be used.

68 Claims, 13 Drawing Sheets

(51) Int. Cl.
*H04W 76/02* (2009.01)
*H04W 76/04* (2009.01)
*H04W 88/18* (2009.01)

(56) References Cited

U.S. PATENT DOCUMENTS

| | | | |
|---|---|---|---|
| 6,353,666 B1* | 3/2002 | Henderson et al. | 379/229 |
| 6,411,725 B1* | 6/2002 | Rhoads | 382/100 |
| 6,493,441 B1* | 12/2002 | Burgess | 379/188 |
| 6,557,103 B1* | 4/2003 | Boncelet et al. | 713/176 |
| 6,892,175 B1* | 5/2005 | Cheng et al. | 704/205 |
| 6,947,571 B1* | 9/2005 | Rhoads et al. | 382/100 |
| 7,307,980 B1* | 12/2007 | Shah | 370/352 |
| 7,373,513 B2* | 5/2008 | Levy | 713/176 |
| 7,403,775 B2* | 7/2008 | Patel et al. | 455/432.1 |
| 7,742,588 B2* | 6/2010 | Rodman et al. | 379/202.01 |
| 7,844,292 B2 | 11/2010 | Shamburger | |
| 7,974,846 B2* | 7/2011 | Tsuchinaga et al. | 704/272 |
| 8,081,751 B1* | 12/2011 | Martin et al. | 379/373.01 |
| 8,457,346 B2* | 6/2013 | Rodriguez et al. | 382/100 |
| 2001/0033325 A1 | 10/2001 | Kikuchi | |
| 2002/0080271 A1* | 6/2002 | Eveleens et al. | 348/473 |
| 2002/0082839 A1* | 6/2002 | Hinde et al. | 704/270.1 |
| 2002/0090114 A1* | 7/2002 | Rhoads et al. | 382/100 |
| 2003/0012403 A1* | 1/2003 | Rhoads et al. | 382/100 |
| 2003/0031200 A1 | 2/2003 | Lehtimaki | |
| 2003/0063569 A1 | 4/2003 | Kalliokulju et al. | |
| 2003/0210659 A1 | 11/2003 | Chu et al. | |
| 2003/0231594 A1* | 12/2003 | Xu et al. | 370/236 |
| 2004/0037314 A1 | 2/2004 | Spear | |
| 2004/0203652 A1* | 10/2004 | Yan | 455/414.1 |
| 2004/0254796 A1* | 12/2004 | Lehtimaki | 704/500 |
| 2005/0143984 A1 | 6/2005 | Makinen et al. | |
| 2005/0232232 A1* | 10/2005 | Farber et al. | 370/352 |
| 2006/0026293 A1* | 2/2006 | Virdi et al. | 709/231 |
| 2006/0205354 A1* | 9/2006 | Pirzada et al. | 455/66.1 |
| 2006/0251256 A1* | 11/2006 | Asokan et al. | 380/270 |
| 2007/0041320 A1 | 2/2007 | Chen et al. | |
| 2007/0055689 A1* | 3/2007 | Rhoads et al. | 707/102 |
| 2007/0070980 A1* | 3/2007 | Phelps et al. | 370/352 |
| 2007/0206505 A1* | 9/2007 | Forbes | 370/252 |
| 2007/0208805 A1* | 9/2007 | Rhoads et al. | 709/203 |
| 2007/0274386 A1* | 11/2007 | Rhoads | 375/240.12 |
| 2008/0176586 A1* | 7/2008 | George et al. | 455/466 |
| 2009/0086631 A1* | 4/2009 | Jayapalan et al. | 370/231 |
| 2009/0222848 A1* | 9/2009 | Ramaswamy | 725/9 |
| 2009/0241170 A1* | 9/2009 | Kumar et al. | 726/3 |
| 2010/0287579 A1* | 11/2010 | Petrovic et al. | 725/9 |
| 2010/0296526 A1* | 11/2010 | Rhoads | 370/522 |
| 2011/0044163 A1 | 2/2011 | Nishioka | |
| 2011/0116651 A1* | 5/2011 | Gunn et al. | 381/94.1 |
| 2011/0208514 A1* | 8/2011 | Tsuchinaga et al. | 704/201 |
| 2011/0294501 A1 | 12/2011 | Wang et al. | |
| 2011/0313762 A1* | 12/2011 | Ben-David et al. | 704/231 |
| 2011/0317681 A1 | 12/2011 | Nishioka | |

FOREIGN PATENT DOCUMENTS

| | | | |
|---|---|---|---|
| JP | 6-205116 | * 7/1994 | H04M 3/42 |
| JP | H06296202 A | 10/1994 | |
| JP | 2000232409 A | 8/2000 | |
| JP | 2002523993 A | 7/2002 | |
| JP | 2002247137 A | 8/2002 | |
| JP | 2009516958 A | 4/2009 | |
| WO | 9960738 A1 | 11/1999 | |
| WO | WO-0011892 A1 | 3/2000 | |
| WO | 03092312 A1 | 11/2003 | |
| WO | 2006063622 A1 | 6/2006 | |
| WO | 2007059201 A2 | 5/2007 | |
| WO | 2008086823 A1 | 7/2008 | |
| WO | 2010117326 A1 | 10/2010 | |
| WO | 2010148151 A1 | 12/2010 | |

OTHER PUBLICATIONS

International Search Report and Written Opinion—PCT/US20111037968, International Search Authority—European Patent Office—Aug. 31, 2011.

ETSI TS 101 732: "Digital cellular telecommunications system (Phase 2+); Tandem Free Operation (TFO); Service Description; Stage 2 (GSM 03.53 version 8.0.0 Release 1999)", Mar. 1, 2000, XP050357983, figure 1, sections 6.1,6.2 and 6.4.

International Search Report and Written Opinion—PCT/US2012/063439—ISA/EPO—Jan. 18, 2013.

* cited by examiner

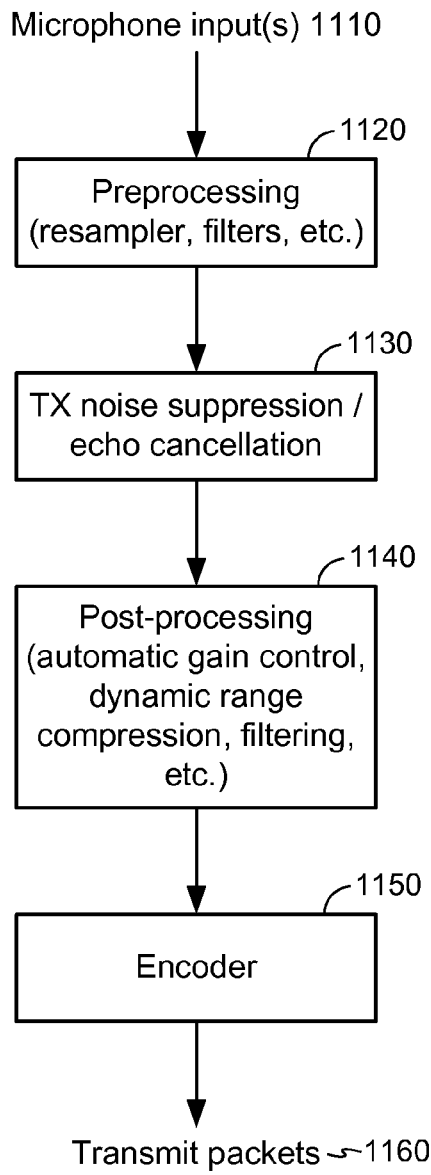
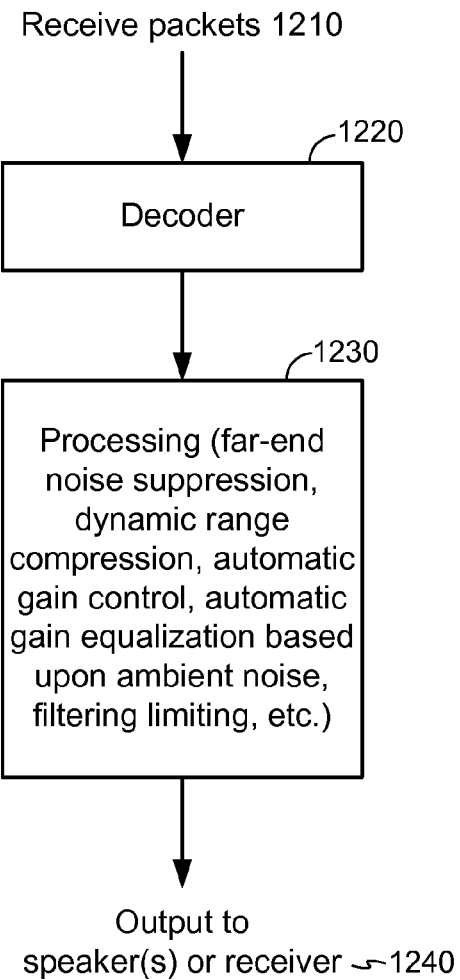
FIG. 11
1100
Voice TX Path Processing
(endpoint 1)
FIG. 12
1200
Voice RX Path Processing
(endpoint 2)

APPLICATION NOTIFICATION AND SERVICE SELECTION USING IN-BAND SIGNALS

CROSS-REFERENCE TO RELATED APPLICATIONS

This application claims priority under the benefit of 35 U.S.C. §119(e) to Provisional Patent Application No. 61/555,327, filed Nov. 3, 2011. This provisional patent application is hereby expressly incorporated by reference herein in its entirety.

This application is a continuation-in-part of pending U.S. patent application Ser. No. 12/904,900, "CODEC DEPLOYMENT USING IN-BAND SIGNALS," filed Oct. 14, 2010, the entire content of which is hereby incorporated by reference.

This application claims priority under the benefit of 35 U.S.C. §119(e) to Provisional Patent Applications No. 61/348,203, filed May 25, 2010 and No. 61/373,243, filed Aug. 12, 2010. These provisional patent applications are hereby expressly incorporated by reference herein in its entirety.

BACKGROUND

In telecommunications networks, information is transferred in an encoded form between a transmitting communication device and a receiving communication device, such as an originating station and a terminating station. The transmitting communication device encodes original information, such as voice signals, into encoded information and sends it to the receiving communication device. The receiving communication device decodes the received encoded information to recreate the original information. The encoding and decoding is performed using codecs. The encoding of voice signals is performed in a codec located in the transmitting communication device, and the decoding is performed in a codec located in the receiving communication device.

Passing control information and data as well as enhancements between a transmitting communication device and a receiving communication device (e.g., mobile telephones and/or non-mobile telephones) may not be implemented because of infrastructure upgrade cost to operators and service providers as well as the core architectural complexity and availability of appropriate handsets. There is a need for allowing the selection and/or the triggering of control information and data, including enhancements, pre- and post-processing features, and non-standard vocoder types, across an existing circuit switched network.

SUMMARY

After a voice call is established between two or more stations (such as mobile devices), in-band signaling may be used between the stations to pass control information and data between the stations. The in-band signals are used to probe whether the stations are compatible. For example, if a receiving station detects and reacts to the in-band signals, then the stations may use the in-band signaling (or in some implementations, an out of band (OOB) interface) as a conduit to send various types of information without any need of infrastructure upgrade and/or quality compromise to legacy phone users (i.e., stations that are not compatible with each other). Additionally or alternatively, watermarking may be used to determine whether the stations are compatible and/or to send various types of information between the stations.

In an implementation, the devices may exchange control signals (of the devices) through signals in an in-band channel (or in some implementations, an out of band interface). The devices may then be controlled based on the exchanged control signals.

In an implementation, device information may be exchanged, such as handset vendor identification (ID), chipset vendor ID, operating system version ID, and modem capability or type of data connection. In another implementation, personal information of a user may be exchanged between the devices.

In an implementation, a degree of audio-quality related settings of a device may be controlled (e.g., enabled, disabled, or adjusted) based upon the information received through in-band signaling (or in some implementations, an out of band interface). For example, the techniques may be used for enabling or disabling or controlling the amount of far end noise suppression or receive voice enhancement of one device based on information about the other device. As another example, the information that is exchanged may contain the transmitting device (e.g., the Tx side) proximity sensor information (e.g., how far away from a person's head is the phone) and control the receiving device's (e.g., the Rx side) loudness or frequency response. Additional audio notification may be sent. The signals in the in-band channel and/or out of band interface also may be used for other low-rate data, such as an image or location data.

In an implementation, the in-band signals are designed such that (a) they are not received as a valid packet by a legacy decoder (e.g., a decoder that cannot operate using the in-band signaling as a conduit), and (b) if they reach the receiver of a station that can operate using the in-band signaling as a conduit, the station can reliably conclude that the transmission path is transcoding free and the station on the other side is also operable using the in-band signaling as a conduit so that the two stations may use the in-band signaling as a conduit.

In an implementation, the probing in-band signals are transmitted periodically for a limited time frame to minimize the quality impact to legacy phone users.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 11 is a diagram of an implementation of processing of a voice transmitting path;

FIG. 12 is a diagram of an implementation of processing of a voice receiving path;

DETAILED DESCRIPTION

After a call is established between two or more stations (such as mobile devices), in-band signaling may be used between the stations to pass control information and data between the stations. The in-band signals are used to probe whether the stations are compatible. For example, if a receiving station detects and reacts to the in-band signals, then the stations may use the in-band signaling as a conduit to send various types of information without any need of infrastructure upgrade and/or quality compromise to legacy phone users (i.e., stations that are not compatible with each other). Thus, the devices may exchange control signals (of the devices) through signals in an in-band channel. Additionally or alternatively, the probing and/or the exchange of control signals may be performed through an out of band (OOB) interface. The devices may then be controlled based on the exchanged control signals.

Figure 1:
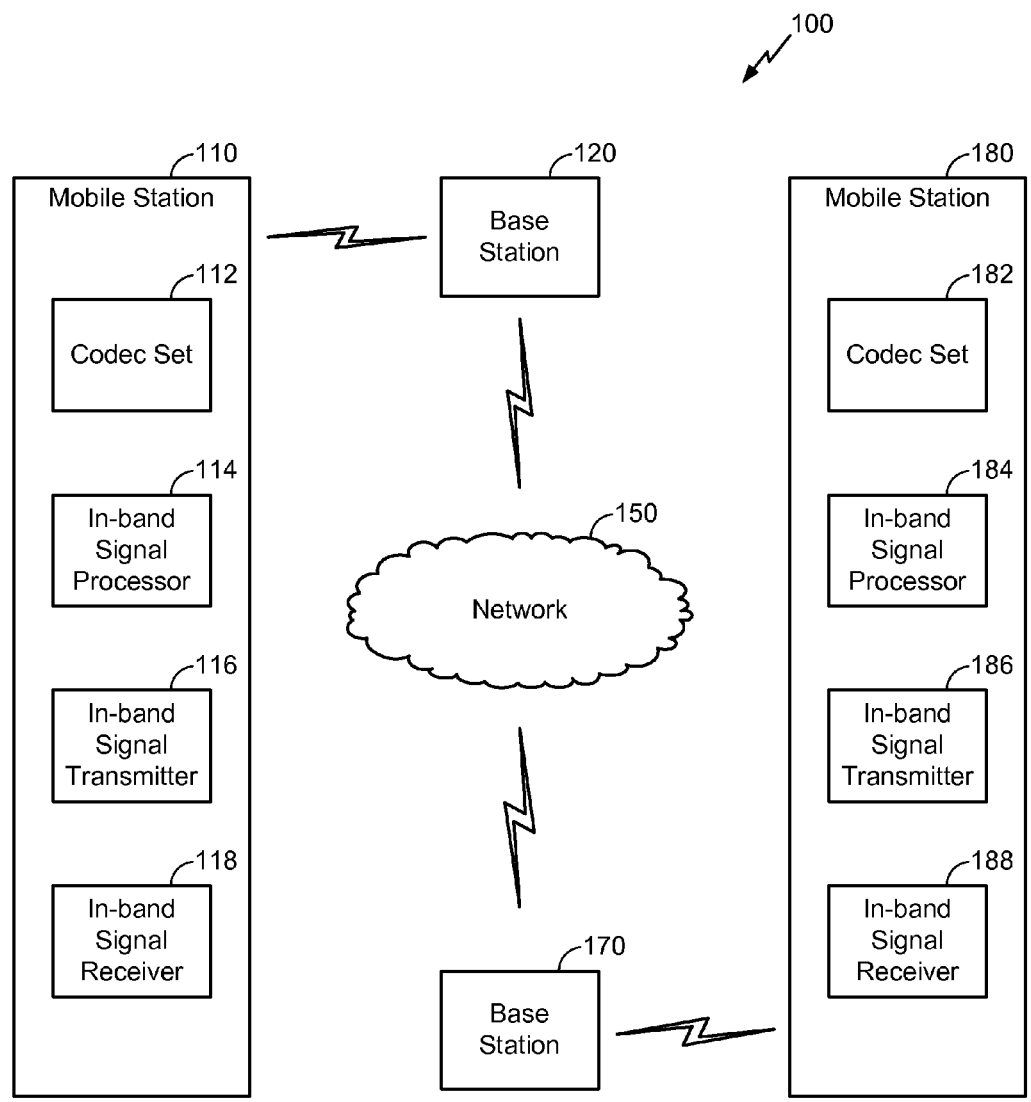
FIG. 1 is an illustration of an example environment for providing in-band signaling as a conduit between two stations.

FIG. 1 is an illustration of an example environment 100 for providing in-band signaling as a conduit between two stations. The environment 100 can use, without limitation, code division multiple access (CDMA) principles, Global System for Mobile Communications (GSM) principles, or other wireless principles including wideband CDMA (WCDMA), cdma2000 (such as cdma2000 1x or 3x air interface standards, for example), time division multiple access (TDMA), and frequency division multiple access (FDMA), for example. Multimedia content, including speech, can alternatively be provided, for example, over a bidirectional point-to-point link if desired, such as, e.g., a Bluetooth link or an 802.11 link or a CDMA link or GSM link. Likewise, speech content may also be transmitted using a Voice over Internet Protocol (VoIP). VoIP is a protocol optimized for the transmission of voice through the Internet or other packet switched networks, which may interface with and/or merge with CDMA and GSM based systems.

Within the environment 100, a call is established between a mobile station 110 and a mobile station 180 via base stations 120, 170, and a network 150. The base station 120 may establish a communication link with the mobile station 110 over the air interface. Various over the air interfaces developed for wireless communication systems include FDMA, TDMA, and CDMA. In connection therewith, various domestic and international standards have been established including, e.g., Advanced Mobile Phone Service (AMPS), GSM, and Interim Standard 95 (IS-95). Implementations described herein reside in a wireless telephony communication system configured to employ a CDMA over the air interface. Nevertheless, it would be understood by those skilled in the art that methods and apparatuses having features as described herein may reside in any of the various communication systems employing a wide range of technologies known to those of skill in the art, such as systems employing VoIP over wired and/or wireless (e.g., CDMA, TDMA, FDMA, etc.) transmission channels.

The base station 120 may establish a communication link with the base station 170 through the network 150, and the base station 170 may establish a communication link with the mobile station 180 over the air interface. The communication links may be CDMA communication links, but the application is not limited thereto, as any wireless or wireline type communication links may be used depending on the implementation and without departing from the spirit of the invention.

In an implementation, the environment 100 may comprise a wireless communication network. The wireless communication network may be a CDMA system, a GSM system, etc. Wireless communication networks are widely deployed to provide various communication services such as voice, video, packet data, messaging, broadcast, etc. These wireless communication networks may include packet switched networks and circuit switched networks. Packet switched refers to transfer of data for a user via common resources (e.g., a shared channel) that may be shared by multiple users. Circuit switched refers to transfer of data for a user via dedicated resources (e.g., a dedicated channel) assigned to the user. Any network may be used within the environment 100, such as those capable of transcoder free operation (TrFO) or tandem free operation (TFO). Example networks include a cdma2000 1x circuit switched network and a cdma2000 1x packet switched network. An implementation of a circuit switched network is described with respect to FIG. 2, for example.

Transcoding is a process by which a voice signal encoded according to one rate and encoding standard is converted to another encoding standard and possibly another rate. Transcoding can introduce latency and degradation in the voice signal being transmitted. To avoid the difficulties associated with transcoding, TrFO has been developed. With transcoder free operation, a connection is established between telecommunications endpoints, such as mobile telephones and/or non-mobile telephones, that have compatible codecs so the connection does not use transcoders. TrFO has been widely deployed to eliminate the quality degradation due to network transcoding. Transcoding is not limited to the case when the source and the destination device use incompatible codecs. Additionally, TFO is a technique that may be used to deliver encoded information from one device to another device faithfully when the core network is circuit switched.

In an implementation, the network 150 (i.e., the core network), comprises a wired connection (e.g., a T1 or E1 type backhaul). A core network is the central part of a telecommunications network that provides various services to customers who are connected to it, e.g. by an access network. In some implementations, the core network (e.g., the network 150) may be wireless. Depending on the implementation, the connection between the base station(s) 120, 170 and the core network may be wired or wireless.

The techniques described herein may be used for the networks and technologies mentioned above as well as other networks and radio technologies. For clarity, certain aspects of the techniques are described below for 3GPP2 networks, and 3GPP2 terminology is used in much of the description below. In 3GPP2, IS-2000 Releases 0 and A are commonly referred to as cdma2000 1X, and IS-2000 Releases C and D are commonly referred to as cdma2000 1xEV-DV. IS-2000 networks are circuit switched networks and are commonly referred to as 1X networks. IS-856 is commonly referred to as High Rate Packet Data (HRPD), cdma2000 1xEV-DO, 1xEV-DO, 1x-DO, DO, High Data Rate (HDR), etc. IS-856 networks are packet switched networks and are commonly referred to as HRPD networks.

Each mobile station 110, 180 may be a wireless communication device such as a cellular phone, a terminal, a handset, a personal digital assistant (PDA), a wireless modem, a cordless phone, a handheld device, a laptop computer, etc. An example mobile station is described with respect to FIG. 13.

There are many different speech codecs. With some codecs, transcoding may be required when the source and destination devices use incompatible codecs. The mobile station 110 has a codec set 112 and the mobile station 180 has a codec set 182. Each codec set 112, 182 has a number of codecs that can be selectively enabled for processing audio data. The codec set 112 may be the same or different as the codec set 182. For example, the codec set 112 may have the same number of codecs and the same capabilities as the codec set 182. As another example, the codec set 112 may have a different number of codecs and/or different capabilities as the codec set 182. Examples of codecs that can be included in the codec sets 112, 182 include EVRC-WB and EVRC-B, although any number and types of codecs can be used without departing from the spirit of the invention.

The mobile station 110 may also comprise an in-band signal processor 114, an in-band signal transmitter 116, and an in-band signal receiver 118. The in-band signal processor 114 may generate in-band signals for transmission from the in-band signal transmitter 116 to the mobile station 180, and may process in-band signals received via the in-band signal receiver 118 from the mobile station 180. Similarly, the mobile station 180 may comprise an in-band signal processor 184 to generate in-band signals for transmission from an in-band signal transmitter 186 to the mobile station 110, and to process in-band signals received via the in-band signal receiver 188 from the mobile station 110. In telecommunications, in-band signaling is the sending of metadata and control information in the same band, on the same channel, as used for data; that is, utilizing the connection reserved for user data transmission. In some implementations, the data channel may be a voice data channel, while in other implementations, any type data channel may be used. For example, metadata may be transferred over a data channel. In some implementations, non-voice data may be transmitted over a voice channel, or additional voice data may be transmitted over a voice channel.

Call setup is the process of establishing dedicated physical channels and negotiating service configuration parameters between a mobile station and a base station so that communication can take place. After a call is established between the two mobile stations 110 and 180 using a codec that has been negotiated during call setup, in-band signaling may be used between the two mobile stations 110, 180 as a conduit to pass control information and data, for example, such as triggering an application on a remote station, generating system sounds, events, or notifications on a remote station, and selecting new vocoder types, all without changes to the network.

In an implementation, the call is established with a codec (e.g., EVRC-B, narrowband), and in-band signals are sent from the terminating (i.e., receiving) station to the originating mobile station. The in-band signals are indicative that the terminating station can operate using the in-band signaling as a conduit and are used to probe whether the originating station can also operate using the in-band signaling as a conduit. If the originating station detects and reacts to the in-band signals, then both stations may communicate control data or other information, described herein, using the in-band signaling as a conduit. In some implementations, an OOB interface may be used instead of the in-band signaling for probing and/or as a conduit. Such techniques are performed without any need of infrastructure upgrade and/or quality compromise to legacy phone users (i.e., stations that cannot operate using the in-band signaling or an OOB interface as a conduit). Thus, in an implementation, in-band signaling and/or an OOB interface is used to determine the capabilities of the stations and/or send actionable information between the stations participating in the established call. The transmission and activation of the actionable information is not visible to the infrastructure. In some implementations, either station or both stations can send the probing in-band signals after the call is established.

In an implementation, the in-band signals are designed such that (a) they are not received as a valid packet by a legacy decoder (e.g., a decoder that cannot operate using the in-band signaling as a conduit indicated by the in-band signals transmitted by the terminating station) and (b) if they reach the receiver of a station that can operate using the in-band signaling as a conduit, the station can reliably conclude that (1) the transmission path is transcoding free and (2) the station on the other side is also operable using the in-band signaling as a conduit so that it will be ready to exchange or receive actionable information using the in-band signals. The probing in-band signals are transmitted periodically for a limited time frame to minimize the quality impact to legacy phone users.

Each mobile station may be capable of communicating with packet switched networks and circuit switched networks. It is contemplated and hereby disclosed that the configurations disclosed herein may be adapted for use in networks that are packet switched (for example, wired and/or wireless networks arranged to carry audio transmissions according to protocols such as VoIP) and/or circuit switched. It is also contemplated and hereby disclosed that the configurations disclosed herein may be adapted for use in narrowband coding systems (e.g., systems that encode an audio frequency range of about four or five kilohertz) and for use in wideband coding systems (e.g., systems that encode audio frequencies greater than five kilohertz), including wholeband wideband coding systems and split-band wideband coding systems. Example combinations include circuit switched air interface and circuit switched core network, circuit switched air interface and packet switched core network, and IP access and packet switched core network, for example. It is further contemplated that although examples herein are described with respect to two endpoints (e.g., two stations), this is not intended to be limiting, as additional endpoints may be incorporated depending on the implementation. Thus, more than two endpoints may be used with the examples described herein, in various implementations.

Figure 2:
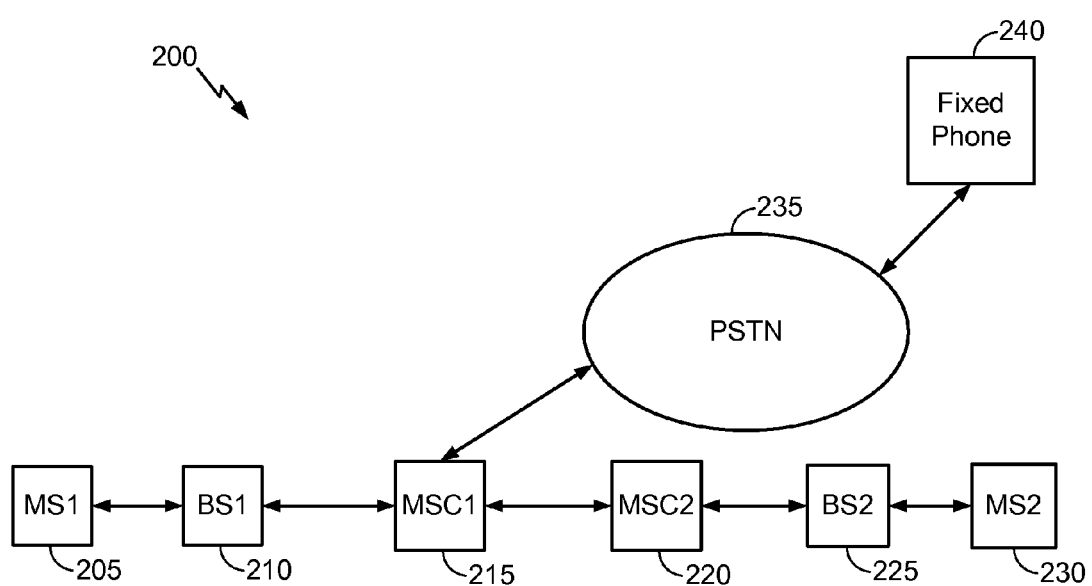
FIG. 2 is a diagram of an example network infrastructure.

FIG. 2 is a diagram of an example circuit switched network 200. The network 200 comprises mobile stations 205, 230 (MS1, MS2), base stations 210, 225 (BS1, BS2), mobile switching centers 215, 220 (MSC1, MSC2), a public switched telephone network 235 (PSTN), and a fixed phone 240. The MSCs 215, 220 may support circuit switched services (e.g., voice) and may perform radio resource management, mobility management, and other functions to support communications for the mobile stations 205, 230 with circuit switched calls. It is contemplated that wideband service may be used for a mobile to mobile call in an implementation if the network can operate in TFO, or in TrFO with a packet switched (PS) domain.

Modern Second Generation (2G) and Third Generation (3G) radio telephone communication systems have sought to produce voice quality commensurate with the conventional PSTN. The PSTN has traditionally been limited in bandwidth to the frequency range of 300-3400 kHz. New networks for voice communications, such as cellular telephony and VoIP, are not necessarily constrained by the same bandwidth limits. Accordingly, it may be desirable to transmit and receive voice communications that include a wideband frequency range over such networks. For example, it may be desirable to support an audio frequency range that extends down to 50 Hz and/or up to 7 or 8 kHz. It may also be desirable to support other applications, such as high-quality audio or audio/video conferencing, that may have audio speech content in ranges outside the traditional PSTN limits Codecs which seek to extend the audio frequency range as set forth above are commonly referred to as wideband codecs.

Circuit switched networks and packet switched networks are well known and a further description is omitted for brevity. The network 200 is not limited to the components shown and may comprise more or fewer mobile stations, base stations, mobile switching centers, and fixed phones, for example, and may comprise alternative and/or additional components not shown. The collection of base stations and mobile switching centers may be referred to as "infrastructure".

In an implementation, a call is established between a first mobile station and a second mobile station. It is determined if both mobile stations are "special" as defined herein. If so, actionable information may be sent from one station to the other station, or exchanged between the stations, using in-band signaling and/or an OOB interface. As described further herein, in-band signaling may be used along with probes in order to determine the capabilities of the mobile stations (e.g., whether one or more of the mobile stations is special) and/or to send actionable information. The sending of actionable information, and the acting on that actionable information, is not visible to the infrastructure.

More particularly, end-to-end in-band signaling is used to deploy or otherwise enable one or more features, described further herein, that enhance user call experience without any need of infrastructure upgrade and/or quality compromise to legacy phone users (i.e., users of mobile stations or non-mobile stations that do not have the in-band signaling functionality described herein and thus are not "special").

Figure 3:
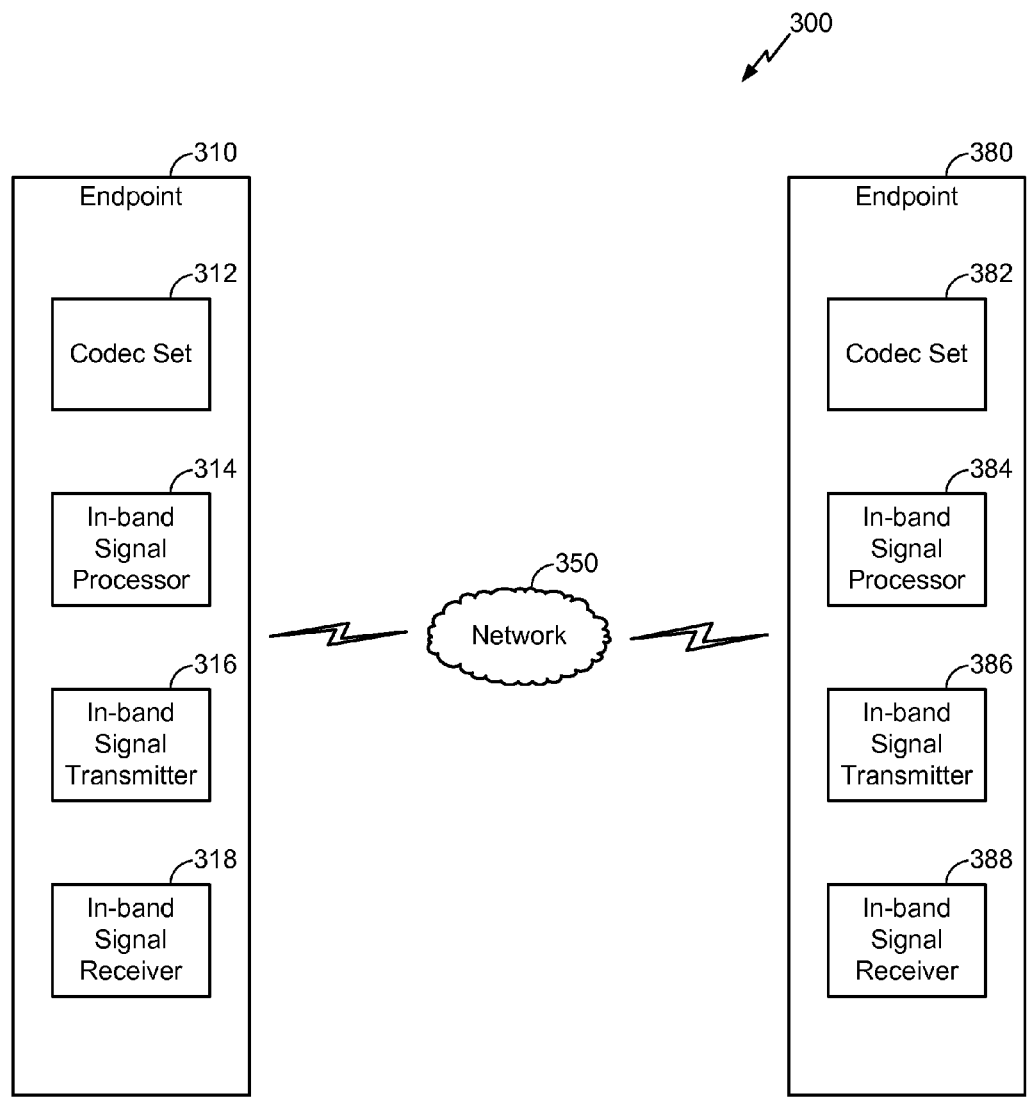
FIG. 3 is an illustration of another example environment for providing in-band signaling as a conduit between two stations.

FIG. 3 is an illustration of another example environment 300 for providing in-band signaling as a conduit between two stations. Endpoint 310 and endpoint 380 (also referred to as stations) are communication devices that communicate with each other via a network 350. Each endpoint 310, 380 may be a mobile station, or may be a non-mobile station such as a personal computer (PC) or a telephone for example. In other words, each endpoint 310, 380 can be any terminal or computing device adapted for communication with another endpoint over the network 350. An example computing device that may comprise a non-mobile station, for example, is described with respect to FIG. 14.

Each endpoint 310, 380 comprises a codec set 312, 382, an in-band signal processor 314, 384, an in-band signal transmitter 316, 386, and an in-band signal receiver 318, 388, similar to that described with respect to FIG. 1. Any number and types of codecs can be used without departing from the spirit of the invention.

Similar to the functionality described with respect to FIG. 1, for example, each in-band signal processor (e.g., processor 314) may generate in-band signals for transmission from the in-band signal transmitter (e.g., transmitter 316) to the other endpoint (e.g., endpoint 380) via the network 350, and may process in-band signals received via the in-band signal receiver (e.g., receiver 318) from the other endpoint. Each in-band signal processor, in-band signal transmitter, and in-band signal receiver may be implemented using one or more computing devices such as the computing device 1400 illustrated in FIG. 14.

As described further herein, after a call is established between the two endpoints 310, 380 using a codec that has been negotiated during call setup, in-band signaling (or signaling in an OOB interface depending on the implementation) may be used between the two endpoints 310, 380 to send, receive, or exchange actionable information. In an implementation, the call is established with a codec and in-band probe signals are sent from the terminating endpoint to the originating endpoint to probe whether the originating endpoint can also operate using in-band signals as a conduit. If the originating endpoint detects and reacts to the in-band signals, then both endpoints may communicate actionable information using in-band signals (or an OOB interface depending on the implementation) as a conduit. There is no need of infrastructure upgrade and/or quality compromise to users of endpoints that cannot operate using in-band signals as a conduit. Thus, in an implementation, in-band signaling and/or an OOB interface is used to determine the capabilities of the endpoint and/or to send, receive, or exchange actionable information between the endpoints.

The network 350 can be any network, depending on the implementation. The network 350 may comprise any combination of the access and core network, and the access network of the endpoint 310 can be different from that of endpoint 380. For example, the access network can be 1x, DO, UMTS, DSL, etc. The core network could be circuit switched domain, packet switched domain, IP, etc.

The in-band signaling techniques allow an endpoint to determine if the other endpoint also has the in-band signaling solution (i.e., is special as described herein) and if the network delivers packets end-to-end without alteration and so that actionable information exchange using the techniques herein is possible.

Figure 4:
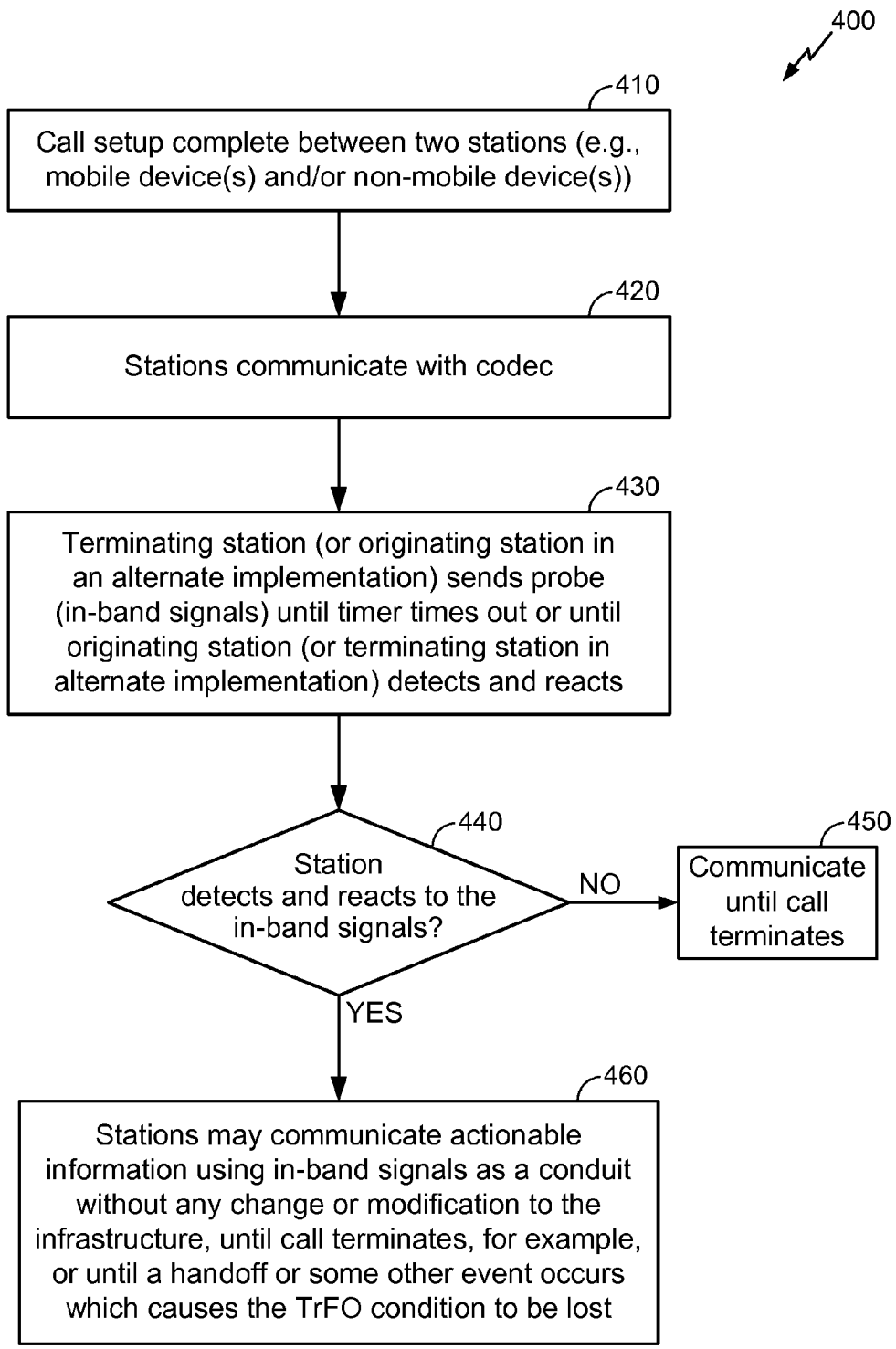
FIG. 4 is an operational flow of an implementation of a method for providing in-band signaling as a conduit between two stations.

FIG. 4 is an operational flow of an implementation of a method 400 for providing in-band signaling as a conduit between two stations. At 410, a call setup is completed between two stations (also referred to as endpoints), such as mobile station 110 and mobile station 180 or endpoint 310 and endpoint 380. For example, mobile station 110 may be the originating station and mobile station 180 may be the terminating station, or endpoint 310 may be the originating station and endpoint 380 may be the terminating station. Each station may be a mobile device or a non-mobile device.

Upon call setup, the originating station and the terminating station communicate at 420 using a previously negotiated codec such as a narrowband codec. The previously negotiated codec may be a predetermined codec that is to be used by stations on the network. Any station on the network may use the previously negotiated codec, including legacy stations which are stations that are not equipped with the in-band signaling functionality and features described herein.

At 430, the terminating station (if it is a special station with in-band signaling functionality) generates in-band signals and sends the in-band signals as a probe to the originating station. The in-band signals are indicative that the terminating station can operate to use the in-band signaling as a conduit to send various types of information and are used to probe whether the originating station can also similarly operate. The various types of information that can be transmitted using in-band signaling includes control information and data, for example, such as triggering an application on a remote station, generating system sounds, events, or notifications on a remote station, and selecting new vocoder types. The in-band signals may also be used to determine whether the network operates in a non-transcoding mode, in an implementation. In TFO, transcoding and non-transcoding are performed in parallel. The in-band signals may be sent when speech is detected or when the terminating station picks up, for example. Thus, in some implementations, the in-band signaling is only sent after the call has been established. However, in other implementation, the in-band signaling may be sent as soon as a call (e.g., a voice call) is placed, before speech is detected or before the terminating station picks up, for example.

In an implementation, the terminating station starts a timer when it begins sending the in-band probe signals. The timer may be used to determine the length of time that the terminating station sends the in-band probe signals. The terminating station may stop transmitting the in-band probe signals after a predetermined length of time if there has been no response from the originating station.

At 440, it is determined at the terminating station whether the originating station has detected and reacted to the in-band signals sent by the terminating station. It may be determined that the originating station has detected and reacted to the in-band signals if the originating station generates and sends a response using in-band signaling to the terminating station.

At 450, if the originating station fails to respond to the in-band probe signals sent by the terminating station (e.g., within the predetermined amount of time as measured by the timer), then communication between the two stations continues using the originally negotiated codec. In this manner, because the originating station did not react to the in-band probe signals, the originating station is not considered to have the capability to use in-band signaling as a conduit to send various types of information. This may happen, for example, if the network does not operate in a non-transcoding mode, and/or if the originating station is not a special station (i.e., is a legacy station), or the probe signal is not reliably detected by the originating station. Thus, users of legacy stations may still call and communicate with stations that have the ability to use the in-band signaling as a conduit to send various types of information (special stations). Thus, even though the terminating station may be a special phone, at 450, the terminating station remains in the original codec mode and does not use the in-band signaling as a conduit to send various types of information until the call terminates (i.e., call release).

At 460, if the originating station does detect and respond to the in-band probe signals, e.g. by sending a confirmation signal to the terminating station, then the stations may pass control information and data as well as enhancements between an originating station and the terminating station without any change or modification to the infrastructure. Communication proceeds until the call terminates, for example, or until a handoff or some other event occurs which causes the TrFO condition to be lost. Communication through in-band signaling can then be retried on a periodic basis until TrFO is again achieved. Thus, in-band signaling is used to determine the capabilities of the stations and/or to send actionable information between the stations participating in the established call.

In an implementation, the terminating station may start sending an in-band probe signal periodically and sets a timer at 430. In an implementation, the in-band signal is sent once every 16 frames, for example. The in-band signal that is sent from the terminating station to the originating station indicates that the terminating station is special. The in-band signal is only sent for an amount of time set by the timer (e.g., 20 seconds). When the timer expires, the terminating station stops sending the in-band signal.

Thus, in an implementation, the terminating station immediately after the completion of call setup, starts sending a probe signal once every predetermined number of frames and sets a timer, if the terminating station is special and the negotiated service option meets the predetermined criteria. The probe signal is transmitted in-band. For example, each time a probe needs to be transmitted, if the normal frame is full rate or eighth rate, a full rate probe is used to replace the normal frame, and if the normal frame is a half rate, a half rate probe is used to replace the normal frame.

In an implementation, before the timer expires, the terminating station may receive an acknowledgement which indicates the originating station is also special and that the originating station has reliably detected the probe signal. The acknowledgement may be an indication that comprises a special signal, an in-band signal, or a sequence of wideband frames based on packet structure, for example (e.g., no quarter rate structure). Otherwise, either the originating station is a legacy station or the probe signal is not reliably detected by the originating station in time before the timer expires.

In an implementation, a special station is capable of supporting both EVRC-B (SO 68) and EVRC-WB (SO 70), and generating, detecting, and reacting to special in-band signals, including a probe signal and an acknowledgement to probe signal, for example, and performing additional operations before responding to some of the Layer 3 messages.

Implementations described herein describe the terminating station sending the in-band probe signals to the originating station. However, alternatively or additionally, the originating station may send the in-band probe signals to the terminating station. In such implementations, the terminating station, if it is not a legacy station, may detect and respond to the in-band signals sent by the originating station.

In an implementation, one station may be equipped so that it sends in-band probe signals regardless of whether it is the originating station or the terminating station. However, the station can communicate with another station which only sends the in-band signal when it is the terminating station, such as for example when a PC client is communicating with a mobile device.

Figure 5:
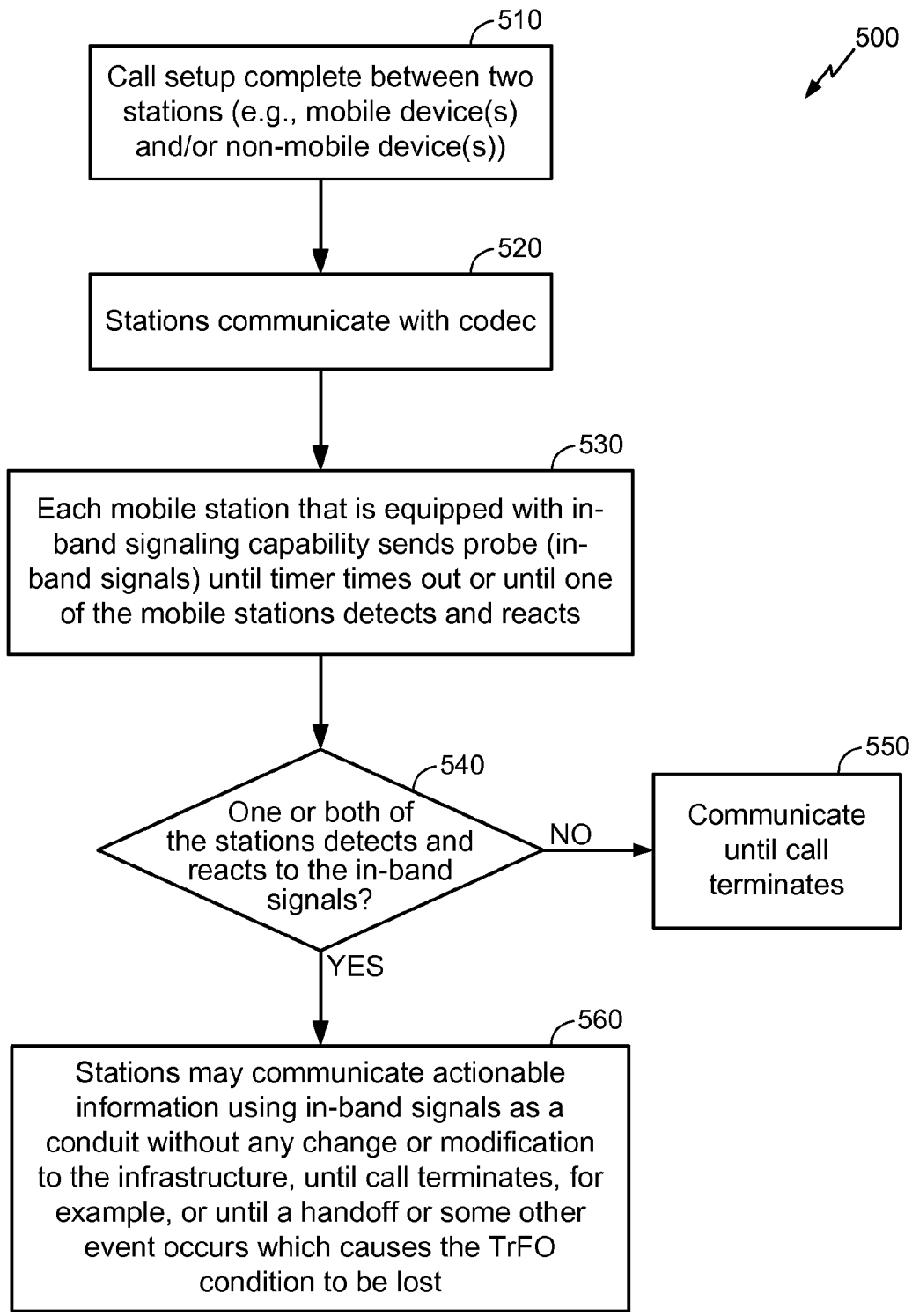
FIG. 5 is an operational flow of another implementation of a method for providing in-band signaling as a conduit between two stations.

FIG. 5 is an operational flow of another implementation of a method 500 for providing in-band signaling as a conduit between two stations. At 510 and 520, similar to 410 and 420, a call setup is completed between two stations, and the originating station and the terminating station communicate using a previously negotiated codec.

At 530, each station that is equipped with the in-band signaling capability generates in-band signals and sends the in-band signals as a probe to the other station. Depending on how each station is equipped (e.g., whether a station is a legacy station or a special station, as the terms are used herein), each station may be equipped to send in-band probe signals and wait for a response from the other station, or only one of the stations may be equipped to send in-band probe signals and wait for (or monitor) a response from the other station. The in-band signals are indicative that the transmitting station can operate to use in-band signaling to send actionable information between the stations participating in the established call and are used to probe whether the other station can operate similarly. In an implementation, each transmitting station (i.e., each special station) starts a timer when it begins sending the in-band probe signals. The timer may be used to determine the length of time that the transmitting station sends the in-band probe signals and the transmitting station may stop transmitting the in-band probe signals after a predetermined length of time if there has been no response from the other station. The transmitting station may stop transmitting the in-band probe signals once a positive acknowledgement is received, even if the timer has not expired. In an implementation, the probe may be used to determine whether or not transcoding is present on the transmission path and/or whether the other station is also a special station.

At 540, it is determined at the transmitting station whether the other station has detected and reacted to the in-band signals sent by the transmitting station. It may be determined that the other station has detected and reacted to the in-band signals if it generates and sends a response using in-band signaling to the transmitting station. If both stations are transmitting in-band signals, then it may be determined if both of the stations detect and react to the in-band signals.

At 550, if neither of the stations (if both stations are acting as transmitting stations, although it is contemplated that only one of the stations acts as a transmitting station as described further herein) detect and react to the in-band signals sent by the other station (e.g., within the predetermined amount of time as measured by the timer(s) set by the transmitting station(s)), then communication between the two stations continues without using in-band signaling to send actionable information between the stations. However, at 560, if the one of the stations does detect and respond to the in-band probe signals, e.g. by sending a confirmation signal to the transmitting station, then the stations may use the in-band signaling as a conduit to send various types of information. Communication proceeds until the call terminates or until a handoff or some other event occurs which causes the TrFO condition to be lost, for example. Communication through in-band signaling can then be retried on a periodic basis until TrFO is again achieved.

It is contemplated that all of the in-band (and/or, in various implementations, OOB) signaling functionalities of the stations (i.e., to make them "special") can be achieved through a software/firmware upgrade. The user experience is enhanced without any infrastructure upgrade and without negative impact to legacy phone users.

Thus, in an implementation, a probe technique is used for TrFO circuit switched calls (i.e., circuit switched voice call traffic channels). The probing is used to determine if two mobile units are compatible with each other. If so, interactive applications, notifications, and service selection may be transmitted over the existing TrFO circuit switched voice call traffic channel. This technique may be applied to GSM, UMTS, and any such circuit switched network that allows a TrFO mode. In implementations for non-EVRC vocoders, a vocoder packet (e.g., a probe message) can be constructed that is near silent and has a predetermined pattern that may be detected to identify and/or determine the existence of two compatible units. Alternatively, in-band signals may be encoded into the vocoder packet (e.g., such as a DTMF tone or any arbitrary signal) to identify and/or determine the existence of two compatible units.

More particularly, in some implementations, application event and stream tunneling is supported over transcoder-free voice traffic channels to provide methods to interact with and trigger the user interface (UI), application, and voice services to provide features across the existing circuit switched network infrastructures. Thus, a mobile device may be used to trigger a remote mobile device to run a new application, generate system sounds/events/notifications, and select new vocoder types, all without changes to the network. For example, this mode of operation may be used as a conduit for renegotiating enhanced voice services such as selecting new vocoder types including types not in the standards, influencing remote settings of voice enhancement algorithms to be environmentally aware, and to provide UI/application enhancements to show visually and audibly events between two mobile devices.

Figure 6:
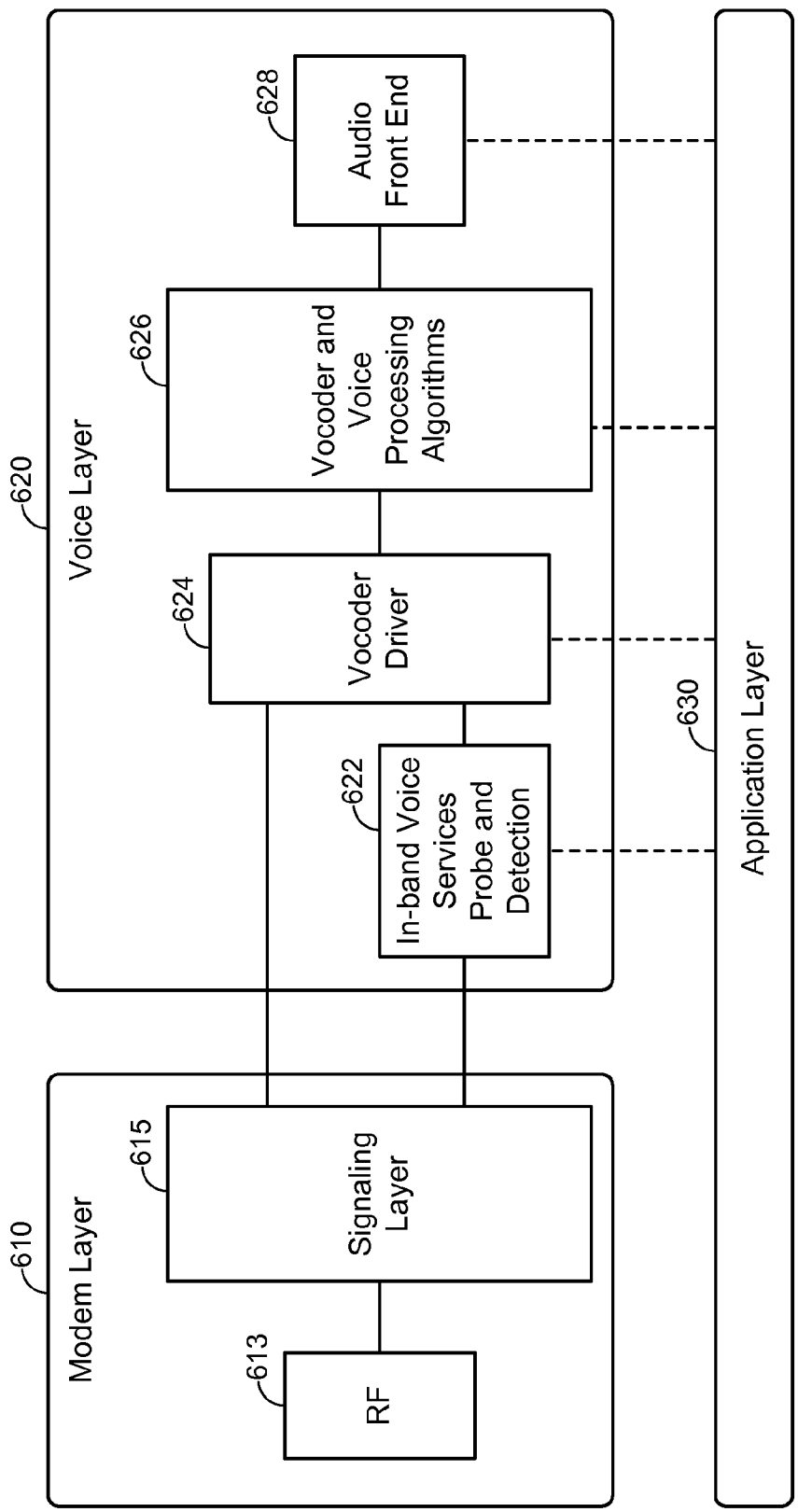
FIG. 6 is a diagram of an implementation of the modem layer, the voice layer, and the application layer of an example device.

FIG. 6 is a block diagram of an implementation of the modem layer 610, the voice layer 620, and the application layer 630 of an example device, such as a mobile station. The modem layer 610 comprises RF 613 which receives and sends RF signals, and a signaling layer 615. The signaling layer 615 sends and receives voice data to the voice layer 620. The voice layer 620 comprises an in-band voice services probe and detection unit 622, a vocoder driver 624, vocoder and voice processing algorithms 626, and an audio front end 628. The voice layer 620 is in communication with the application layer 630. Control data and event notifications may be exchanged between the voice layer 620 and the application layer 630.

The in-band voice service extension (i.e., the use of in-band signals as described herein) is used to detect additional user equipment (UE) capabilities over TrFO for mobile to mobile communications, in an implementation. The additional UE capabilities are used as remotely actionable information to cause compatible UEs to select new or additional enhanced modes of operations without requiring additional infrastructure changes from the carriers. The actionable information is provided to the voice layer and to the application layer to provide enhanced services.

In an implementation, the remotely actionable information may be used to select any vocoder types including non-standardized types, vocoder algorithm revisions, and mode of operations that bypasses the selected call established service option.

In an implementation, the remotely actionable information may be used for two mobile devices to influence each other, such as to negotiate for voice processing enhancements based on UE compatibility, geo-location awareness, human interface sensors, timestamp synchronizations, environmental awareness (orientation, landscape, cavity, latency), and user applications. In some implementations, the remotely actionable information may be used to negotiate for enabling voice feature extensions which are typically controlled by the user interface.

In an implementation, the remotely actionable information may generate events to trigger remote applications to run or to show notifications. Interactive applications can asynchronously send metadata. Events are application dependent. Examples include heart rate monitor, breath analyzer, multiplayer gaming data, and wide area sensors. Any such data may be carried over the in-band signal conduit or the OOB conduit as an alternative when data services are unreliable or cannot be used.

In an implementation, the remotely actionable information may establish an out of band (OOB) link (also referred to herein as an OOB interface, channel, or conduit). For example, a conduit may be provided for the application layer to funnel transcoder-free VoIP streams across the network. The uses and types of remotely actionable information are not limited to those set forth above.

Thus, in some implementations, an OOB interface (e.g., with respect to a cellular network) may be used as the conduit to send the control data or other actionable information described herein. A trigger condition may, for example, cause a station or communication device to activate an out of band radio to send an OOB message containing control data or information. Trigger conditions may include the probing.

For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices.

The OOB interface may, for example, provide a Bluetooth link, an ultra-wideband (UWB) link, an IEEE 802.11 (WLAN) link, etc. It should be appreciated, however, that there is no limitation that the OOB devices and interfaces be low power, short range, and/or low bandwidth. Embodiments may use any suitable out of band link, whether wireless or otherwise, such as IEEE 802.11, Bluetooth, PEANUT, UWB, ZigBee, an IP tunnel, a wired link, etc.

Accordingly, an OOB interface may consume less power than native cellular interface for a given time of operation. In one implementation, such an OOB interface provides relatively low bandwidth communication, relatively short range communication, and/or consumes relatively little power whereas the native cellular interface provides relatively high bandwidth communication, longer range communication, and/or consumes appreciably more power. It should be appreciated, however, that there is no limitation to an OOB interface of particular embodiments to be low power, short range, or low bandwidth.

Figure 7:
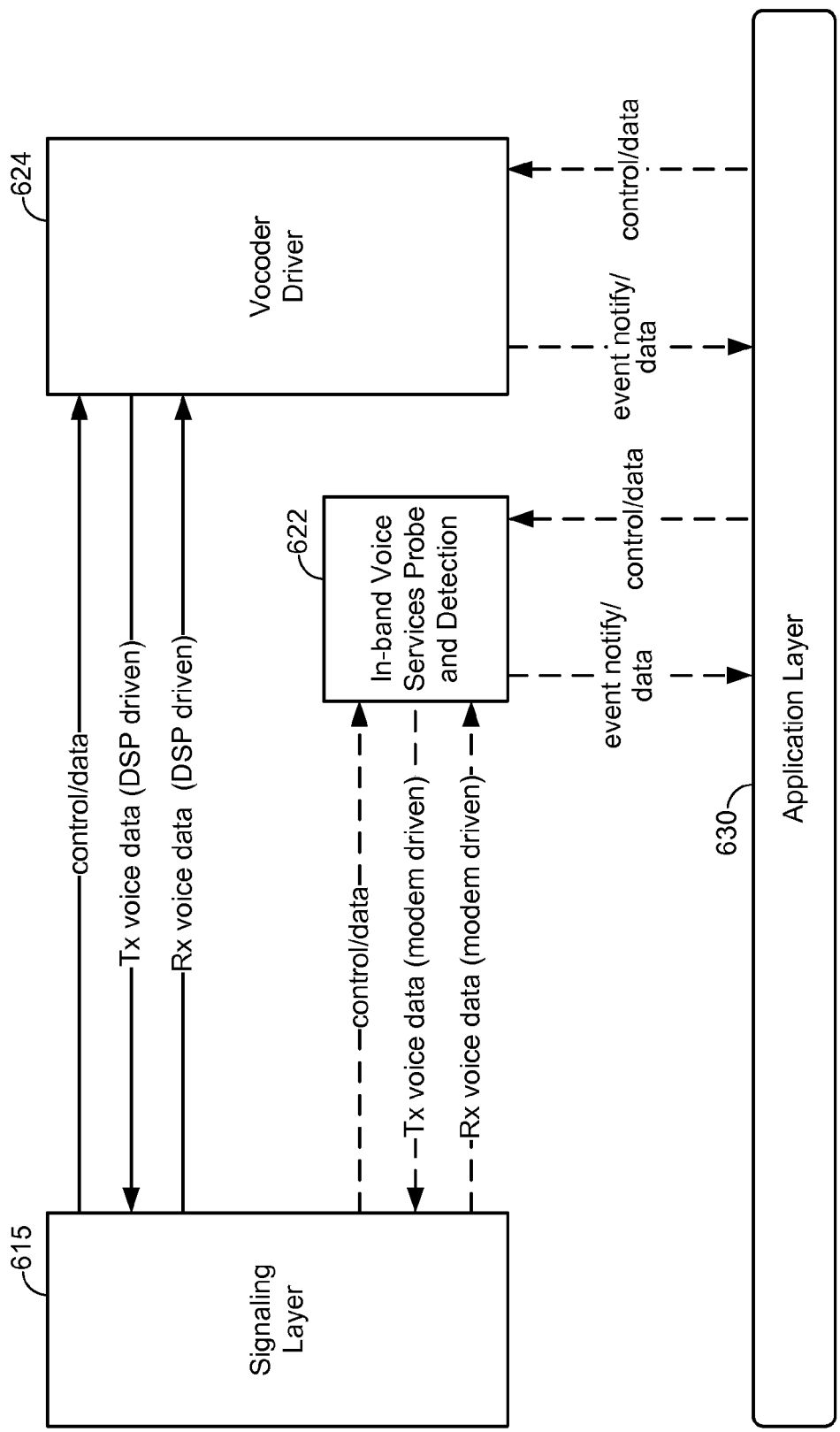
FIG. 7 is a diagram of an example library form implementation.

A library form method may be used to intercept traffic according to an implementation. FIG. 7 shows a block diagram of an example library form implementation. In the library form, the signaling layer 615 determines which vocoder type to select based on the in-band vocoder packet data inspected. The signaling layer 615 of one station probes (e.g., broadcasts) its capabilities to the remote station and listens for special packets from the remote station that indicate the capability of the remote station. The regular data exchanges between the signaling layer 615, the vocoder driver 624, and the voice DSP remain transparent of this work. Any false positive to the detection of the actual vocoder to select would increase the setup latency. This form knows which vocoder to select at setup time rather than post-setup so it provides the least glitches (false positives) to select the right vocoder type.

In a library form implementation, the in-band voice services probe and detection unit 622 may comprise a library that can be called by the signaling layer 615. The application layer 630 may be used to determine which services are shared between compatible devices.

Figure 8:
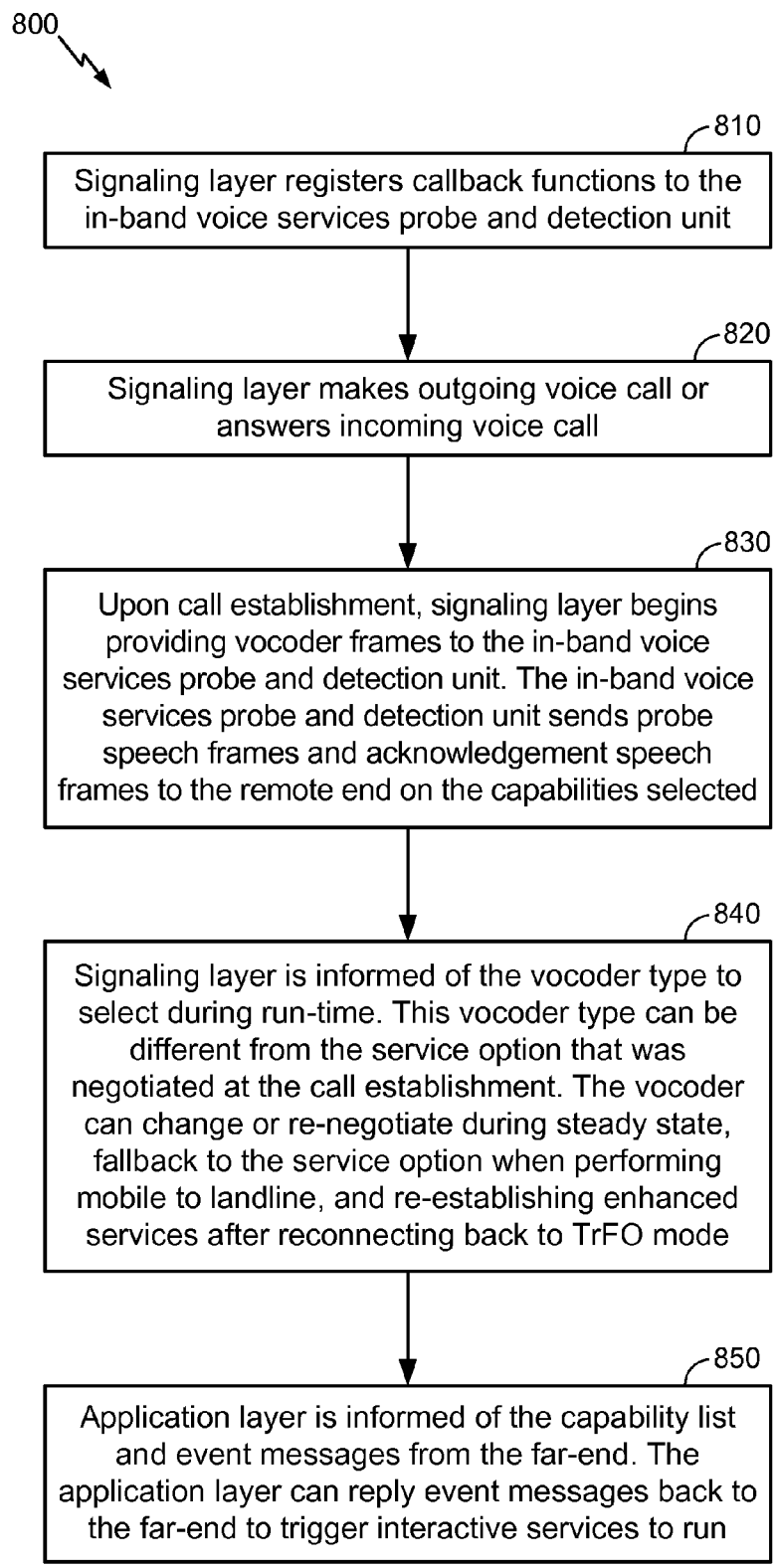
FIG. 8 is an operational flow of an implementation of a library form method that may be used to select a new vocoder type between two compatible mobile stations.

FIG. 8 is a flow diagram of a library form method 800 that may be used to select a new vocoder type between two compatible mobile stations. At 810, the signaling layer 615 of a mobile station registers callback functions to the in-band voice services probe and detection unit 622. At 820, the signaling layer 615 makes an outgoing voice call or answers an incoming voice call.

Upon call establishment, at 830, the signaling layer 615 begins providing vocoder frames to the in-band voice services probe and detection unit 622. The in-band voice services probe and detection unit 622 sends probe speech frames and acknowledgement speech frames to the remote station on the capabilities selected.

At 840, the signaling layer 615 is informed of the vocoder type to select during run-time. This vocoder type can be different from the service option that was negotiated at the call establishment. The vocoder can change or re-negotiate during steady state, fallback to the service option when performing mobile to landline, and re-establish enhanced services after reconnecting back to TrFO mode. At any time both mobile stations cannot determine a reliable operating mode (i.e. such as after a call hold), the mobile stations fall back to the vocoder type selected by the network and re-attempt to re-negotiate capabilities (i.e. after a call resume).

At 850, the application layer 630 is informed of the capability list and event messages from the remote station. The application layer 630 can reply event messages back to the remote station to trigger interactive services to run.

Figure 9:
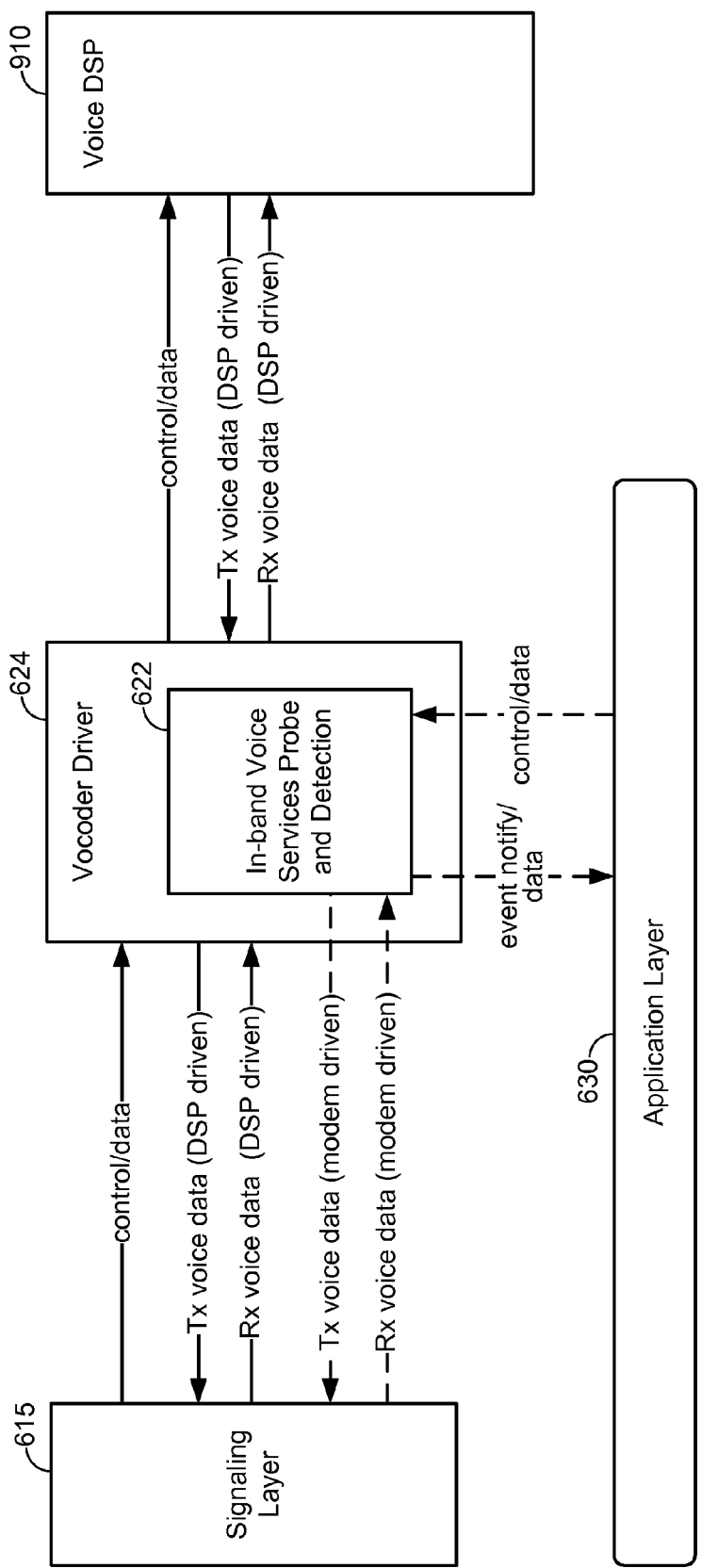
FIG. 9 is a diagram of an example integrated driver form implementation.

In an implementation, an integrated driver form method may be used to intercept traffic. FIG. 9 shows a block diagram of an example integrated driver form implementation. In the integrated driver form, the signaling layer 615 calls the vocoder driver 624 in a normal way. The DSP is used to drive the packet exchange (e.g., probe and detection). Thus, the vocoder driver 624 may provide the in-band voice services probe and detection. In other words, the library that the signaling layer 615 calls is moved into an existing vocoder driver 624. The vocoder driver 624 uses the timing provided by the voice DSP 910 to drive the packet exchanges. On detection of probe frames, the vocoder driver 624 reconfigures the voice DSP 910 to the new vocoder type to run. This implementation allows the modem to use off-chip vocoders from a different vendor. The voice DSP 910 may be any suitable third party voice DSP.

Figure 10:
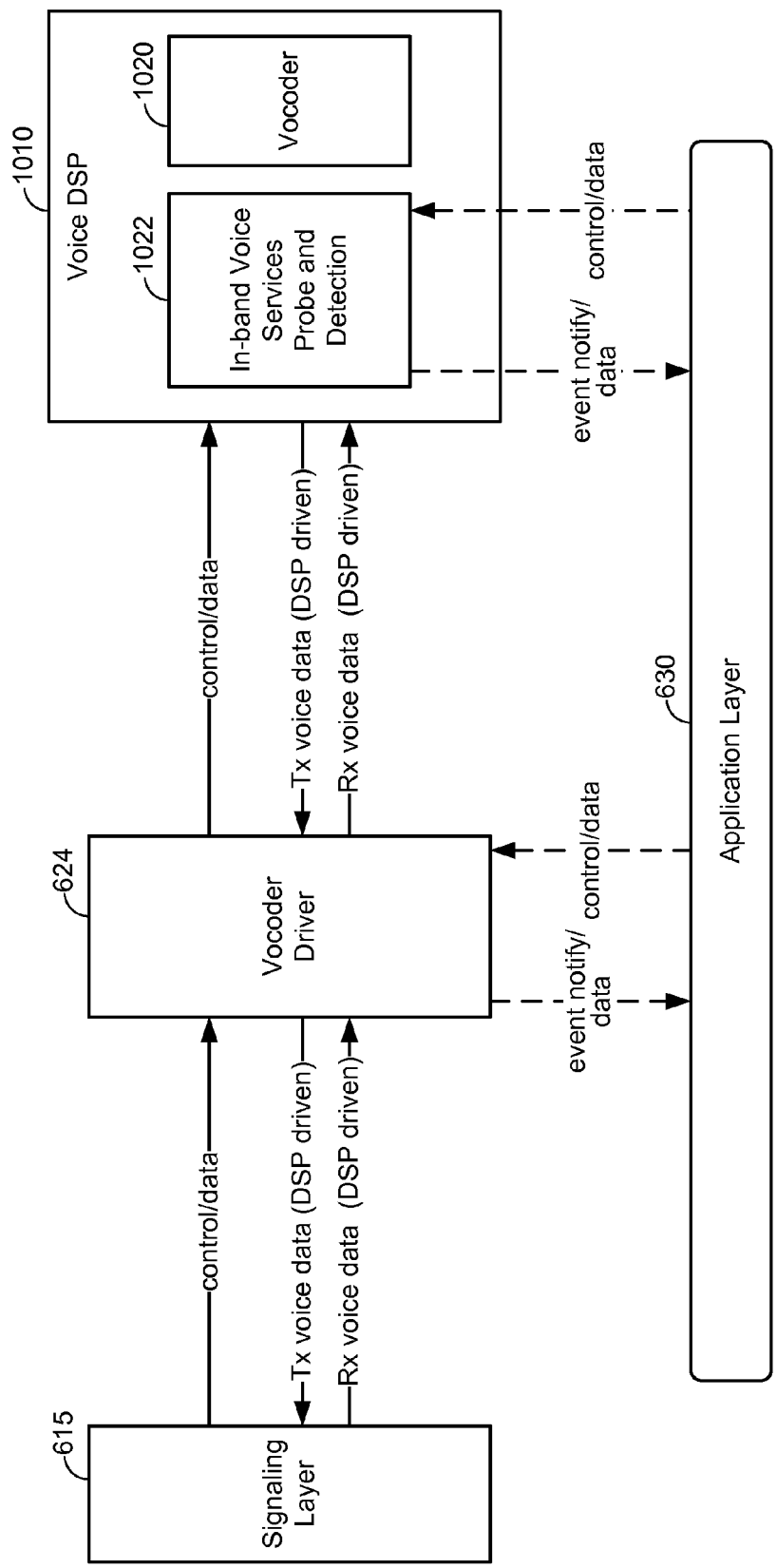
FIG. 10 is a diagram of an example in-band digital signal processing (DSP) form implementation.

In an implementation, an in-band DSP form method may be used to intercept traffic. FIG. 10 shows a block diagram of an example in-band DSP form implementation. In the in-band DSP filter form, the voice DSP 1010 may be used to provide the in-band voice services probe and detection 1022. Thus, the in-band detection is moved into the DSP. Similar to the integrated driver form implementation, the voice DSP 1010 reconfigures itself to switch to a new vocoder type during run-time. This implementation allows the voice DSP solution to work with off-chip modems from a different vendor.

In an implementation, the in-band DSP form method may be used in conjunction with watermarking. The receiving station may receive and extract a watermark and decode data accordingly. A watermark may be implemented as a signature on transmitted signals, and may contain any type of control information or data described herein that may be used to control a station. Alternatively, the watermark may identify that a station can be used in conjunction with in-band signaling and/or OOB interfaces as described herein. When a station receives a watermark, that station may retrieve data associated with the watermark (or its associated signal) and perform the appropriate action (e.g., set a particular control, establish a conduit, etc.).

In some aspects, a mobile device will search the data received from the signal to determine if there is a watermark indicating that there is control information or information about establishing a conduit.

In an implementation, watermarking can be used with the in-band DSP methods described herein as an alternative to periodic probing. In some implementations, the in-band probe method encodes the in-band signal into whole frames which are discarded by the decoder on the terminating endpoint. This means that the in-band signal is transmitted periodically with a long enough period not to adversely affect the voice quality. However, the watermark can be applied to most packets in such a way that they can be decoded by legacy decoders without apparent loss of quality. However, if these watermarked packets survive network transmission (through TrFO) and are decoded by decoders at the receiving station, then the watermark can be interpreted as an in-band signal.

This can be used to convey wideband information, for example, and it can also be used to communicate any of the data or metadata described herein as an alternative to the probe techniques.

The ability to use the circuit switched voice traffic channel for application notifications and triggers provides UI interactivity without requiring data and SMS/MMS services. The ability to use the circuit switched voice traffic channel to select new vocoders and voice services at call setup, handovers, and call hold/switch is not possible with out of band notifications using other traffic channels due to the protocol timing requirements. Such capabilities using the in-band probing and detection approaches described herein are provided without breaking infrastructure compatibility and without noticeable degradation of voice quality performance.

The techniques described herein can be used to trigger OOB data transfer (for larger data transfer), and/or can be used to continue to exchange additional information through the voice channel. In this manner, the user is essentially getting a free low-bitrate data channel. This may be useful, for example, if the user is not subscribed to a data plan for his mobile device. There is no limit to the type of information that may be exchanged through the voice channel, such as information pertaining to the user (e.g., blood pressure monitoring during conversation, caller ID, etc.), device information, (e.g., the type of device the other side is using), and both devices sharing information about noise suppression (NS) settings of each phone such as (e.g., far-end NS is ON/near-end NS is OFF) which may be used to improve speech quality.

In an implementation, device information may be exchanged, such as handset vendor ID, chipset vendor ID, operating system version ID, and modem capability or type of data connection. In another implementation, a user's personal information may be exchanged between the devices. The signals in the in-band channel or OOB channel also may be used for other low-rate data, such as an image or location data.

Regarding voice processing control in an Rx/Tx path, for a call between two or more parties, through the infrastructure-agnostic in-band signaling techniques described herein, the voice quality can be improved in the phone call by selectively enabling or disabling features. FIG. 11 is a diagram of an implementation of processing 1100 of a voice transmitting path, and FIG. 12 is a diagram of an implementation of processing 1200 of a voice receiving path. In FIGS. 11 and 12, noise suppression can occur on endpoint 1 (at 1130), possibly after some preprocessing of the signal from the microphone input(s) (possibly more than one microphone) (at 1110 and 1120). Noise suppression can also be performed by endpoint 2 (at 1230) after receiving and decoding the voice packet (at 1210 and 1220), which may be followed by output to one or more speakers or a receiver at 1240. Noise reduction may be performed as close to the original microphones as possible (in this case, on the TX path in endpoint 1). If such noise suppression is performed on that path, then endpoint 2 should not perform noise suppression, as it will only distort the signal. Therefore, through in-band signaling or OOB signaling, the capabilities of endpoint 1 can be communicated to endpoint 2, such that endpoint 2 can disable its noise suppression module.

Likewise, if endpoint 1 is already performing certain processing such as dynamic range compression or automatic gain control (at 1140), it should communicate that to endpoint 2 so the similar module is not enabled on the other side. After the post-processing at 1140, the data is encoded at 1150 and transmitted at 1160 to the remote station.

Also, the user of endpoint 2 can potentially alter the aggressiveness of the noise suppression on the TX side, through a UI control. Depending upon the environment or the preference of the endpoint 2 user, the endpoint 2 user may want to have better voice quality and/or better noise reduction. This information or setting can be communicated through in-band signaling to endpoint 1 to increase or decrease the noise suppression aggressiveness.

Controlling the aggressiveness of endpoint 1's TX noise suppression from endpoint 2 can also be done automatically based upon information from endpoint 2 user's environment. Other processing that may be controlled at endpoint 2 includes dynamic range compression, automatic gain control, automatic gain equalization based upon ambient noise, filtering, limiting, etc. One of the algorithms in the RX processing chain (endpoint 2) is automatic gain equalization based upon ambient noise. In an implementation, the algorithms for this are known as RVE (receive voice enhancement) and AVC (automatic volume control). These types of algorithms may amplify noise present in the received signal when the user is in a noisy environment. It may be better to reduce the noise in the received signal by increasing the aggressiveness of the TX noise suppression on endpoint 1, using the in-band signaling approach, when there is noise detected in endpoint 2 user's environment.

Thus, the techniques may be used for controlling (enabling/disabling) a degree of audio-quality related settings (Rx/Tx) of the phone based upon the information received through in-band signaling. For example, the Rx side of endpoint 2 may be controlled based on the information, received through in-band signaling, about the Tx side of endpoint 1. Similarly, the Tx side of endpoint 2 may be controlled based on the information, received through in-band signaling, about the Rx side of endpoint 1. As another example, the techniques may be used for enabling or disabling or controlling the amount of Far End Noise Suppression or Receive Voice Enhancement (RVE) of endpoint 2 based on information about endpoint 1.

Furthermore, the information that is exchanged may contain Transmit Device 1 (e.g., the Tx side) proximity sensor information (e.g., how far away from the person's head is the phone) and control the Rx side loudness or frequency response. Additional audio notification may be sent.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The term "signal processing" (and grammatical variants thereof) may refer to the processing and interpretation of signals. Signals of interest may include sound, images, and many others. Processing of such signals may include storage and reconstruction, separation of information from noise, compression, and feature extraction. The term "digital signal processing" may refer to the study of signals in a digital representation and the processing methods of these signals. Digital signal processing is an element of many communications technologies such as mobile stations, non-mobile stations, and the Internet. The algorithms that are utilized for digital signal processing may be performed using specialized computers, which may make use of specialized microprocessors called digital signal processors (sometimes abbreviated as DSPs).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

Figure 13:
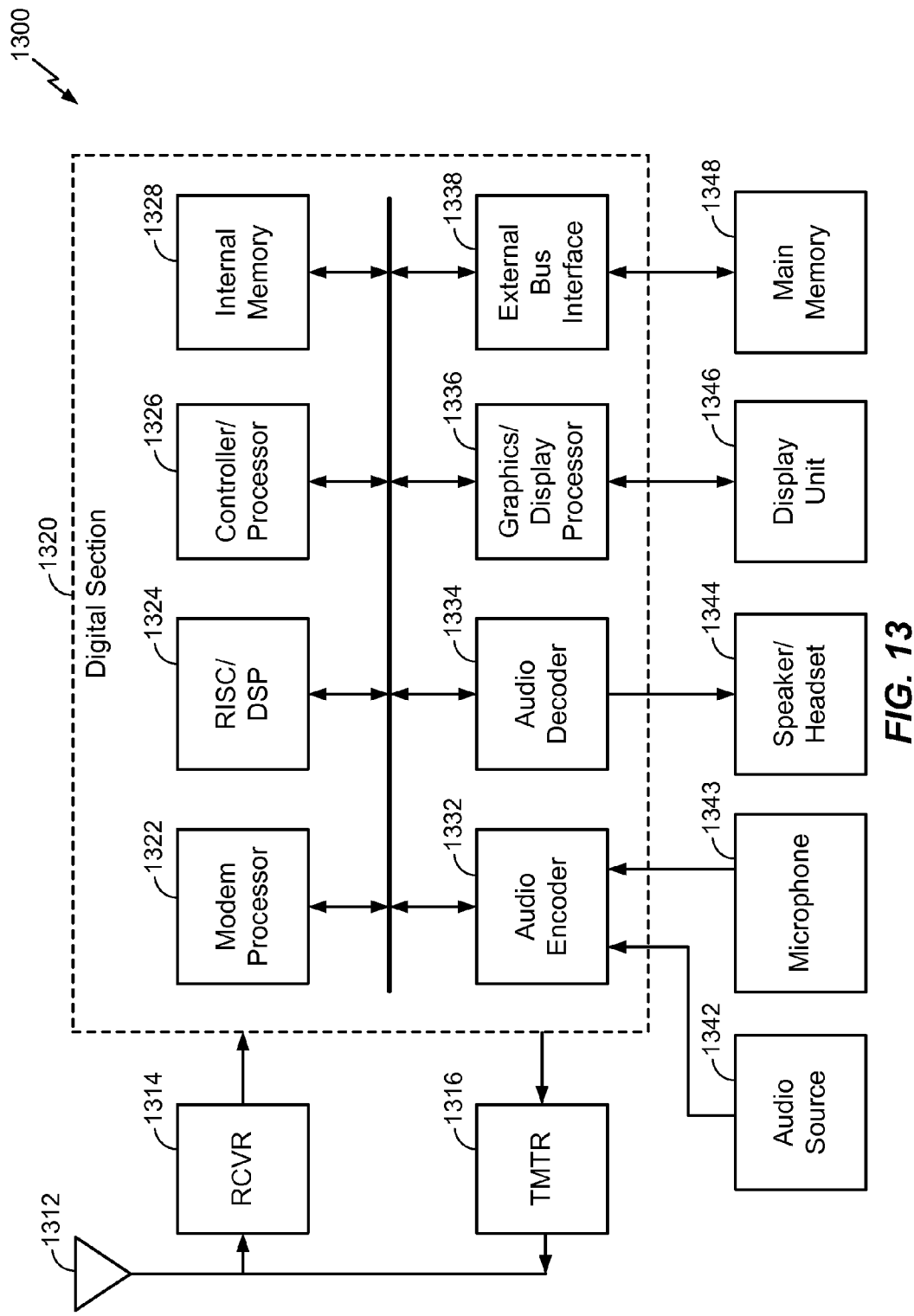
FIG. 13 is a diagram of an example mobile station.

FIG. 13 shows a block diagram of a design of an example mobile station 1300 in a wireless communication system. Mobile station 1300 may be a cellular phone, a terminal, a handset, a PDA, a wireless modem, a cordless phone, etc. The wireless communication system may be a CDMA system, a GSM system, etc.

Mobile station 1300 is capable of providing bidirectional communication via a receive path and a transmit path. On the receive path, signals transmitted by base stations are received by an antenna 1312 and provided to a receiver (RCVR) 1314. Receiver 1314 conditions and digitizes the received signal and provides samples to a digital section 1320 for further processing. On the transmit path, a transmitter (TMTR) 1316 receives data to be transmitted from digital section 1320, processes and conditions the data, and generates a modulated signal, which is transmitted via antenna 1312 to the base stations. Receiver 1314 and transmitter 1316 may be part of a transceiver that may support CDMA, GSM, etc.

Digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio encoder 1332, a generalized audio decoder 1334, a graphics/display processor 1336, and an external bus interface (EBI) 1338. Modem processor 1322 may perform processing for data transmission and reception, e.g., encoding, modulation, demodulation, and decoding. RISC/DSP 1324 may perform general and specialized processing for wireless device 1300. Controller/processor 1326 may direct the operation of various processing and interface units within digital section 1320. Internal memory 1328 may store data and/or instructions for various units within digital section 1320.

Generalized audio encoder 1332 may perform encoding for input signals from an audio source 1342, a microphone 1343, etc. Generalized audio decoder 1334 may perform decoding for coded audio data and may provide output signals to a speaker/headset 1344. Graphics/display processor 1336 may perform processing for graphics, videos, images, and texts, which may be presented to a display unit 1346. EBI 1338 may facilitate transfer of data between digital section 1320 and a main memory 1348.

Digital section 1320 may be implemented with one or more processors, DSPs, microprocessors, RISCs, etc. Digital section 1320 may also be fabricated on one or more application specific integrated circuits (ASICs) and/or some other type of integrated circuits (ICs).

Figure 14:
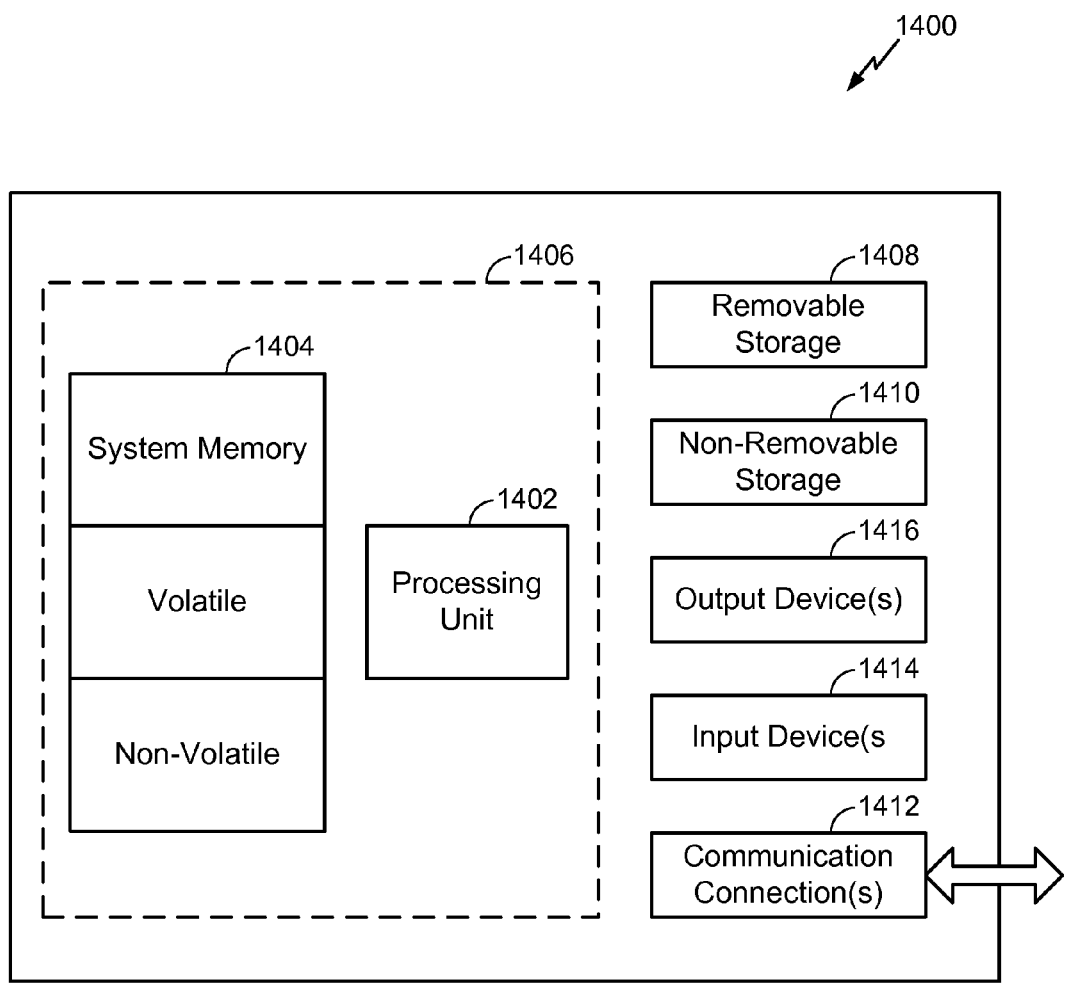
FIG. 14 shows an exemplary computing environment.

FIG. 14 shows an exemplary computing environment in which example implementations and aspects may be implemented. The computing system environment is only one example of a suitable computing environment and is not intended to suggest any limitation as to the scope of use or functionality.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 14, an exemplary system for implementing aspects described herein includes a computing device, such as computing device 1400. In its most basic configuration, computing device 1400 typically includes at least one processing unit 1402 and memory 1404. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 14 by dashed line 1406.

Computing device 1400 may have additional features and/or functionality. For example, computing device 1400 may include additional storage (removable and/or non-removable) including, but not limited to, magnetic or optical disks or tape. Such additional storage is illustrated in FIG. 14 by removable storage 1408 and non-removable storage 1410.

Computing device 1400 typically includes a variety of computer-readable media. Computer-readable media can be any available media that can be accessed by device 1400 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 1404, removable storage 1408, and non-removable storage 1410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer storage media may be part of computing device 1400.

Computing device 1400 may contain communication connection(s) 1412 that allow the device to communicate with other devices. Computing device 1400 may also have input device(s) 1414 such as a keyboard, mouse, pen, voice input device, touch input device, etc. Output device(s) 1416 such as a display, speakers, printer, etc. may also be included. All these devices are well known in the art and need not be discussed at length here.

In general, any device described herein may represent various types of devices, such as a wireless or wired phone, a cellular phone, a laptop computer, a wireless multimedia device, a wireless communication PC card, a PDA, an external or internal modem, a device that communicates through a wireless or wired channel, etc. A device may have various names, such as access terminal (AT), access unit, subscriber unit, mobile station, mobile device, mobile unit, mobile phone, mobile, remote station, remote terminal, remote unit, user device, user equipment, handheld device, non-mobile station, non-mobile device, endpoint, etc. Any device described herein may have a memory for storing instructions and data, as well as hardware, software, firmware, or combinations thereof.

The in-band and OOB signaling techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions on a computer-readable medium, such as random access RAM, ROM, non-volatile RAM, programmable ROM, EEPROM, flash memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of exchanging control signals between a first station in communication with a second station through an infrastructure, comprising:

determining that the first station is equipped to use in-band signaling to exchange control signals with the second station during a voice call, wherein determining that the first station is equipped to use in-band signaling to exchange control signals with the second station comprises determining at the first station that the second station is equipped to use in-band signaling to exchange control signals with the first station by applying a watermark to voice packets, wherein the watermark is interpreted as an in-band signal by the second station if the second station is equipped to use in-band signaling, wherein the first station is a mobile station;

exchanging control signals between the first station and the second station using an in-band channel, wherein the control signals comprise control information and data, and wherein the data comprises data from at least one sensor of the first station or the second station; and exchanging device information between the first station and the second station using the control signals through the in-band channel, wherein the device information is not visible to the infrastructure.

2. The method of claim 1, wherein determining at the first station whether the second station is equipped to use in-band signaling to exchange control signals with the first station further comprises sending probe signals using in-band signaling.

3. The method of claim 1, wherein determining at the first station whether the second station is equipped to use in-band signaling to exchange control signals with the first station further comprises transmitting in-band probe signals to the second station and receiving in-band acknowledgement signals from the second station.

4. The method of claim 3, further comprising transmitting the in-band probe signals periodically for a limited amount of time.

5. The method of claim 3, wherein the first station is capable of generating, detecting, and reacting to in-band signals that are designed such that (a) the in-band probe signals are not received as any of the valid packets by a station that is unequipped to use in-band signaling to exchange information with the first station and (b) if the in-band acknowledgement signals are received by the first station, the first station determines that the transmission path is transcoding free and the second station is equipped to use in-band signaling to exchange information with the first station.

6. The method of claim 1, wherein the control information and data are for at least one of triggering an application on one of the stations, generating system sounds, events, or notifications on one of the stations, or selecting a new vocoder type, without changes to the infrastructure.

7. The method of claim 1, further comprising determining at the first station whether the second station is equipped to use in-band signaling to exchange information with the first station.

8. The method of claim 1, further comprising:
controlling a setting of the first station or of the second station based on the exchanged device information that is received through the in-band signaling of the control signals through the in-band channel.

9. The method of claim 8, wherein the device information comprises actionable information.

10. The method of claim 9, wherein the actionable information comprises control information and data for selecting a new vocoder type without changes to the infrastructure.

11. The method of claim 1, wherein the second station is a mobile station.

12. The method of claim 1, wherein the first station is a terminating station for the voice call.

13. The method of claim 1, wherein the first station is an originating station for the voice call.

14. The method of claim 1, further comprising:
determining that the second station is equipped to use an out of band (OOB) interface to exchange device information with the first station; and
setting an OOB conduit for exchanging device information between the first station and the second station.

15. The method of claim 14, wherein determining whether the second station is equipped to use the OOB interface to exchange information with the first station comprises sending probe signals.

16. The method of claim 14, further comprising exchanging actionable information between the first station and the second station using the OOB interface.

17. The method of claim 1, wherein the at least one sensor comprises one of a proximity sensor, an orientation sensor, and a heart-rate monitor.

18. A system for exchanging control signals between a first station in communication with a second station through an infrastructure, comprising:
an in-band voice services probe and detection unit capable of determining that the first station is equipped to use in-band signaling to exchange control signals with the second station during a voice call, wherein determining that the first station is equipped to use in-band signaling to exchange control signals with the second station comprises determining at the first station that the second station is equipped to use in-band signaling to exchange control signals with the first station by applying a watermark to voice packets, wherein the watermark is interpreted as an in-band signal by the second station if the second station is equipped to use in-band signaling, wherein the first station is a mobile station;
a signaling layer capable of exchanging control signals between the first station and the second station using an in-band channel, wherein the control signals comprise control information and data, and wherein the data comprises data from at least one sensor of the first station or the second station; and
a voice layer capable of exchanging device information between the first station and the second station using the control signals through the in-band channel, wherein the device information is not visible to the infrastructure.

19. The system of claim 18, further comprising a transmitter capable of sending probe signals using in-band signaling.

20. The system of claim 18, further comprising:
a transmitter capable of transmitting in-band probe signals to the second station; and
a receiver capable of receiving in-band acknowledgement signals from the second station.

21. The system of claim 20, wherein the transmitter is further capable of transmitting the in-band probe signals periodically for a limited amount of time.

22. The system of claim 20, wherein the first station is capable of generating, detecting, and reacting to in-band signals that are designed such that (a) the in-band probe signals are not received as any of the valid packets by a station that is unequipped to use in-band signaling to exchange information with the first station and (b) if the in-band acknowledgement signals are received by the first station, the first station determines that the transmission path is transcoding free and the second station is equipped to use in-band signaling to exchange information with the first station.

23. The system of claim 18, wherein the control information and data are for at least one of triggering an application on one of the stations, generating system sounds, events, or notifications on one of the stations, or selecting a new vocoder type, without changes to the infrastructure.

24. The system of claim 18, wherein the in-band voice services probe and detection unit is further capable of determining at the first station whether the second station is equipped to use in-band signaling to exchange information with the first station.

25. The system of claim 18, further comprising:
an application layer capable of controlling a setting of the first station or of the second station based on the exchanged device information that is received through the in-band signaling of the control signals through the in-band channel.

26. The system of claim 25, wherein the device information comprises actionable information.

27. The system of claim 26, wherein the actionable information comprises control information and data for selecting a new vocoder type without changes to the infrastructure.

28. The system of claim 18, wherein the second station is a mobile station.

29. The system of claim 18, wherein the first station is a terminating station for the voice call.

30. The system of claim 18, wherein the first station is an originating station for the voice call.

31. The system of claim 18, wherein the in-band voice services probe and detection unit is further capable of determining that the second station is equipped to use an out of band (OOB) interface to exchange device information with the first station, and setting an OOB conduit for exchanging device information between the first station and the second station.

32. The system of claim 31, wherein determining whether the second station is equipped to use the OOB interface to exchange information with the first station comprises sending probe signals.

33. The system of claim 31, wherein the in-band voice services probe and detection unit is further capable of exchanging actionable information between the first station and the second station using the OOB interface.

34. The system of claim 18, wherein the at least one sensor comprises one of a proximity sensor, an orientation sensor, and a heart-rate monitor.

35. An apparatus for exchanging control signals between a first station in communication with a second station through an infrastructure, comprising:
   means for determining that the first station is equipped to use in-band signaling to exchange control signals with the second station during a voice call, wherein the means for determining that the first station is equipped to use in-band signaling to exchange control signals with the second station comprises means for determining at the first station that the second station is equipped to use in-band signaling to exchange control signals with the first station by applying a watermark to voice packets, wherein the watermark is interpreted as an in-band signal by the second station if the second station is equipped to use in-band signaling, wherein the first station is a mobile station;
   means for exchanging control signals between the first station and the second station using an in-band channel, wherein the control signals comprise control information and data, and wherein the data comprises data from at least one sensor of the first station or the second station; and
   means for exchanging device information between the first station and the second station using the control signals through the in-band channel, wherein the device information is not visible to the infrastructure.

36. The apparatus of claim 35, further comprising means for sending probe signals using in-band signaling.

37. The apparatus of claim 35, further comprising:
   means for transmitting in-band probe signals to the second station; and
   means for receiving in-band acknowledgement signals from the second station.

38. The apparatus of claim 37, further comprising means for transmitting the in-band probe signals periodically for a limited amount of time.

39. The apparatus of claim 37, further comprising means for generating, detecting, and reacting to in-band signals that are designed such that (a) the in-band probe signals are not received as any of the valid packets by a station that is unequipped to use in-band signaling to exchange information with the first station and (b) if the in-band acknowledgement signals are received by the first station, the first station determines that the transmission path is transcoding free and the second station is equipped to use in-band signaling to exchange information with the first station.

40. The apparatus of claim 35, wherein the control information and data are for at least one of triggering an application on one of the stations, generating system sounds, events, or notifications on one of the stations, or selecting a new vocoder type, without changes to the infrastructure.

41. The apparatus of claim 35, further comprising means for determining at the first station whether the second station is equipped to use in-band signaling to exchange information with the first station.

42. The apparatus of claim 35, further comprising:
   means for controlling a setting of the first station or of the second station based on the exchanged device information that is received through the in-band signaling of the control signals through the in-band channel.

43. The apparatus of claim 42, wherein the device information comprises actionable information.

44. The apparatus of claim 43, wherein the actionable information comprises control information and data for selecting a new vocoder type without changes to the infrastructure.

45. The apparatus of claim 35, wherein the second station is a mobile station.

46. The apparatus of claim 35, wherein the first station is a terminating station for the voice call.

47. The apparatus of claim 35, wherein the first station is an originating station for the voice call.

48. The apparatus of claim 35, further comprising:
   means for determining that the second station is equipped to use an out of band (OOB) interface to exchange device information with the first station; and
   means for setting an OOB conduit for exchanging device information between the first station and the second station.

49. The apparatus of claim 48, wherein determining whether the second station is equipped to use the OOB interface to exchange information with the first station comprises sending probe signals.

50. The apparatus of claim 48, further comprising means for exchanging actionable information between the first station and the second station using the OOB interface.

51. The apparatus of claim 35, wherein the at least one sensor comprises one of a proximity sensor, an orientation sensor, and a heart-rate monitor.

52. A non-transitory computer-readable medium comprising computer-readable instructions that cause a computer to:
   determine that a first station is equipped to use in-band signaling to exchange control signals with a second station during a voice call, wherein determining that the first station is equipped to use in-band signaling to exchange control signals with the second station comprises determining at the first station that the second station is equipped to use in-band signaling to exchange control signals with the first station by applying a watermark to voice packets, wherein the first station is a mobile station;
   exchange control signals between the first station and the second station using an in-band channel, wherein the control signals comprise control information and data, and wherein the data comprises data from at least one sensor of the first station or the second station; and exchange device information between the first station and the second station through an infrastructure using the control signals through the in-band channel, wherein the device information is not visible to the infrastructure.

53. The computer-readable medium of claim 52, further comprising instructions that cause the computer to send probe signals using in-band signaling.

54. The computer-readable medium of claim 52, further comprising instructions that cause the computer to transmit in-band probe signals to the second station and receive in-band acknowledgement signals from the second station.

55. The computer-readable medium of claim 54, further comprising instructions that cause the computer to transmit the in-band probe signals periodically for a limited amount of time.

56. The computer-readable medium of claim 54, further comprising instructions that cause the computer to generate, detect, and react to in-band signals that are designed such that (a) the in-band probe signals are not received as any of the valid packets by a station that is unequipped to use in-band signaling to exchange information with the first station and (b) if the in-band acknowledgement signals are received by the first station, the first station determines that the transmission path is transcoding free and the second station is equipped to use in-band signaling to exchange information with the first station.

57. The computer-readable medium of claim 52, wherein the control information and data are for at least one of triggering an application on one of the stations, generating system sounds, events, or notifications on one of the stations, or selecting a new vocoder type, without changes to the infrastructure.

58. The computer-readable medium of claim 52, further comprising instructions that cause the computer to determine at the first station whether the second station is equipped to use in-band signaling to exchange information with the first station.

59. The computer-readable medium of claim 52, further comprising instructions that cause the computer to:
control a setting of the first station or of the second station based on the exchanged device information that is received through the in-band signaling of the control signals through the in-band channel.

60. The computer-readable medium of claim 59, wherein the device information comprises actionable information.

61. The computer-readable medium of claim 60, wherein the actionable information comprises control information and data for selecting a new vocoder type without changes to the infrastructure.

62. The computer-readable medium of claim 52, wherein the second station is a mobile station.

63. The computer-readable medium of claim 52, wherein the first station is a terminating station for the voice call.

64. The computer-readable medium of claim 52, wherein the first station is an originating station for the voice call.

65. The computer-readable medium of claim 52, further comprising instructions that cause the computer to:
determine that the second station is equipped to use an out of band (OOB) interface to exchange device information with the first station; and
set an OOB conduit for exchanging device information between the first station and the second station.

66. The computer-readable medium of claim 65, wherein determining whether the second station is equipped to use the OOB interface to exchange device information with the first station comprises sending probe signals.

67. The computer-readable medium of claim 65, further comprising instructions that cause the computer to exchange actionable information between the first station and the second station using the OOB interface.

68. The computer-readable medium of claim 52, wherein the at least one sensor comprises one of a proximity sensor, an orientation sensor, and a heart-rate monitor.

\* \* \* \* \*